United States Patent
Matheson et al.

(10) Patent No.: US 9,061,754 B2
(45) Date of Patent: Jun. 23, 2015

(54) HIGH PULLOFF CAPABILITY HAT STRINGER

(71) Applicant: The Boeing Company, Seal Beach, CA (US)

(72) Inventors: Donald P. Matheson, Redmond, WA (US); Kenneth L. Brook, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/146,580

(22) Filed: Jan. 2, 2014

(65) Prior Publication Data

US 2014/0120318 A1 May 1, 2014

Related U.S. Application Data

(62) Division of application No. 12/638,977, filed on Dec. 15, 2009.

(51) Int. Cl.
*B64D 9/00* (2006.01)
*B64C 1/06* (2006.01)
*B64C 3/18* (2006.01)

(52) U.S. Cl.
CPC .......... *B64C 1/064* (2013.01); *Y10T 29/49622* (2015.01); *Y10T 428/2457* (2015.01); *Y10T 428/24612* (2015.01); *Y10T 428/31511* (2015.04); *B64C 3/182* (2013.01)

(58) Field of Classification Search
CPC .......... B64C 1/061; B64C 3/185; B64C 3/26; B64C 1/26; B64C 3/187; B64C 1/064; B64C 3/182; Y10T 428/31511; Y10T 29/49622; Y10T 428/24612; Y10T 428/2457
USPC ......... 244/123.1, 119, 132, 124; 53/405, 416, 53/429, 460
See application file for complete search history.

(56) References Cited

U.S. PATENT DOCUMENTS

| | | | |
|---|---|---|---|
| 2,390,761 A * | 12/1945 | Watter | 244/124 |
| 7,635,106 B2 | 12/2009 | Pham et al. | |
| 7,744,974 B2 * | 6/2010 | Pearson et al. | 428/36.91 |
| 8,262,969 B2 * | 9/2012 | Wade et al. | 264/257 |
| 2008/0128554 A1 | 6/2008 | Pham et al. | |
| 2008/0268208 A1 | 10/2008 | Martin et al. | |
| 2008/0290214 A1 | 11/2008 | Guzman et al. | |
| 2008/0302912 A1 * | 12/2008 | Yip et al. | 244/119 |
| 2008/0302915 A1 | 12/2008 | Yip et al. | |
| 2012/0148801 A1 * | 6/2012 | Kwon et al. | 428/157 |

* cited by examiner

*Primary Examiner* — Valentina Xavier

(57) ABSTRACT

A structure may comprise a skin member and a hat stringer. The hat stringer may include a base portion and first and second webs extending outwardly from the base portion. The first and second webs may be formed of a wrap laminate having wrap plies and a cover laminate having cover plies. The first and second webs may be interconnected by a cap. The hat stringer and skin member may be co-cured.

18 Claims, 15 Drawing Sheets

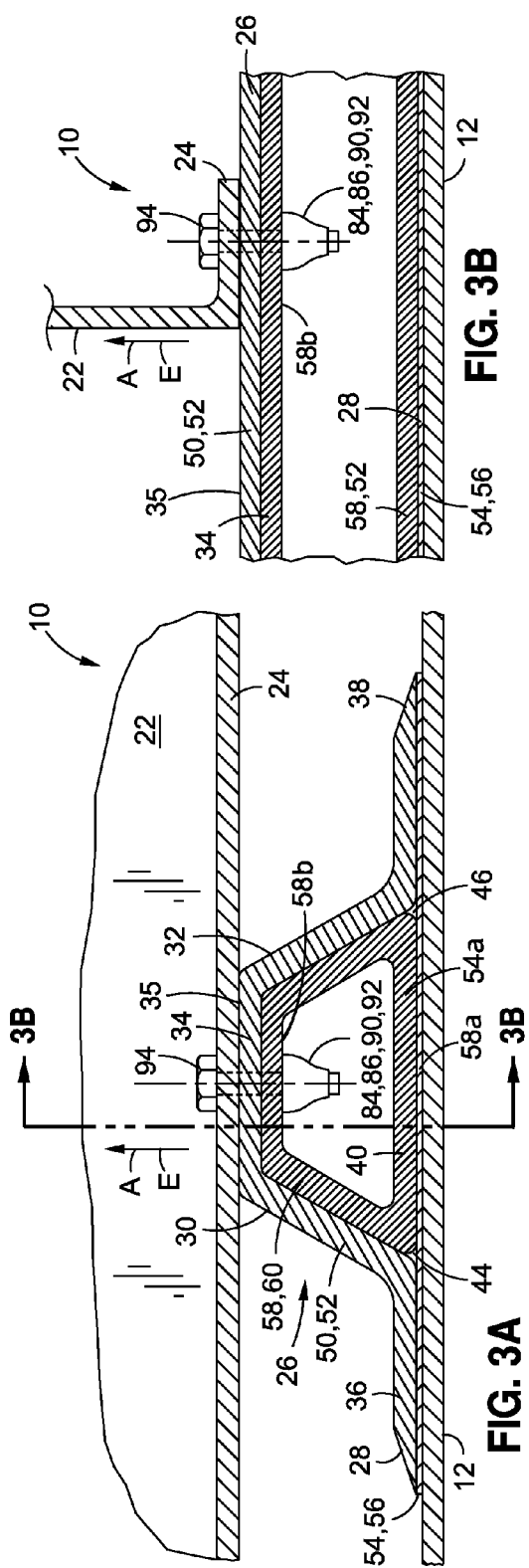
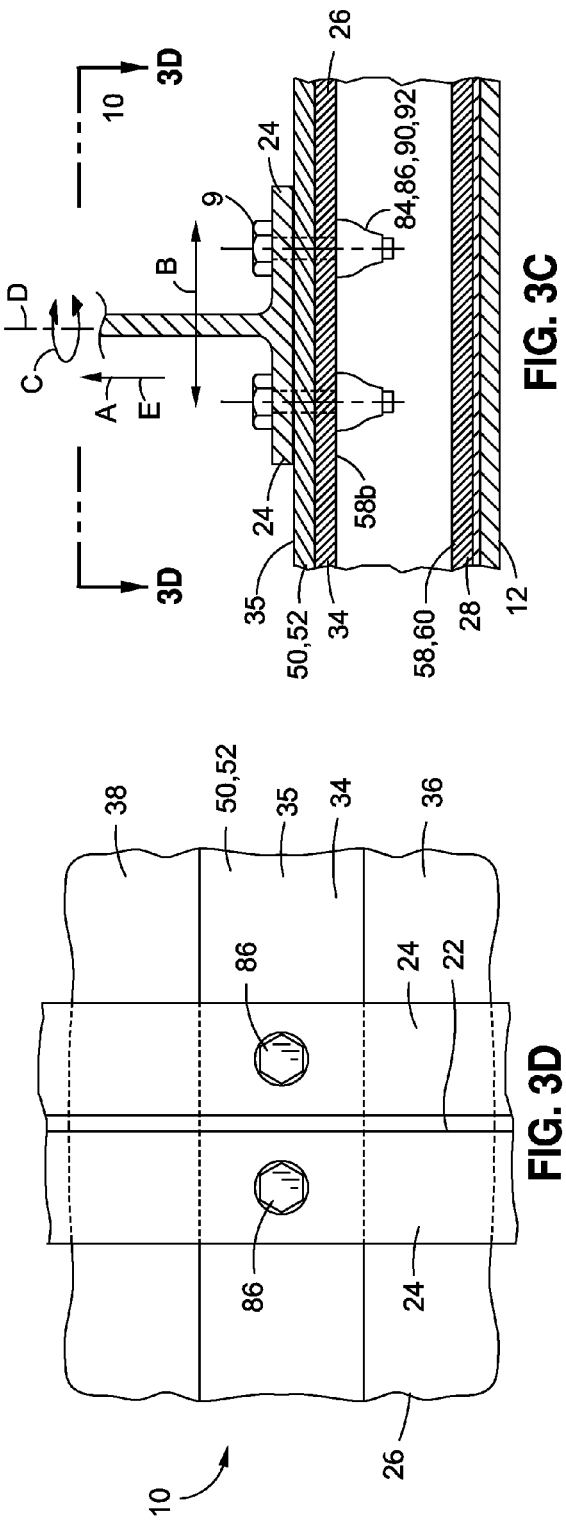

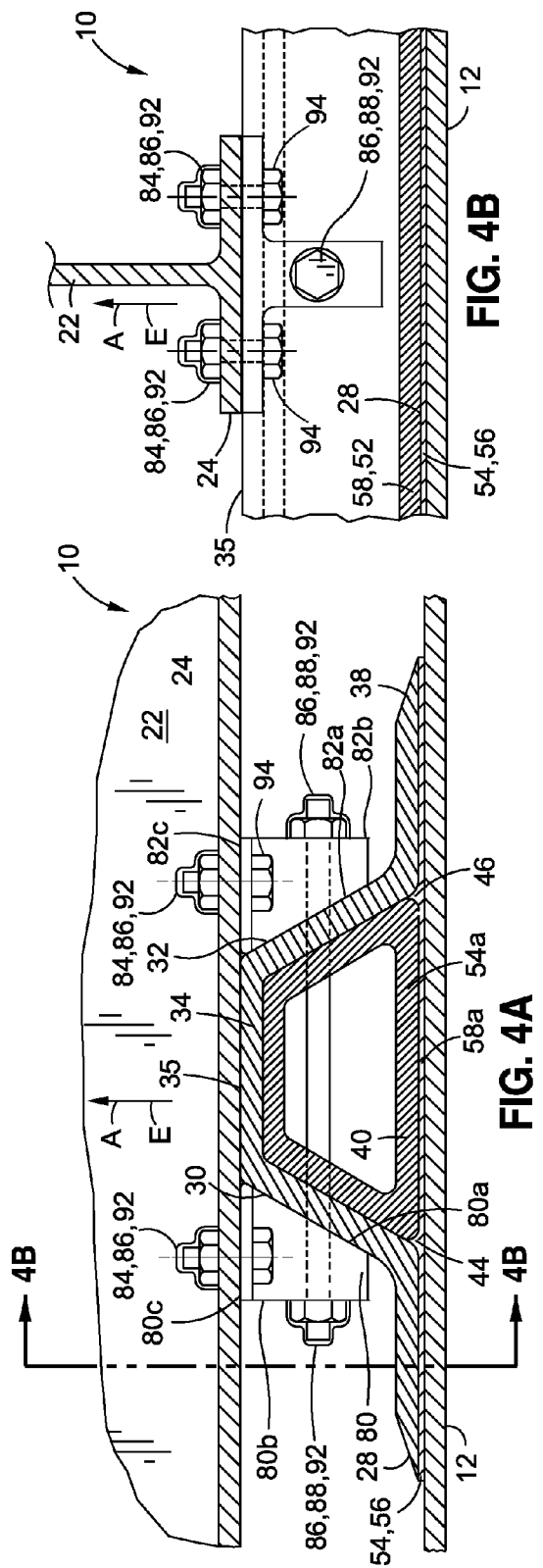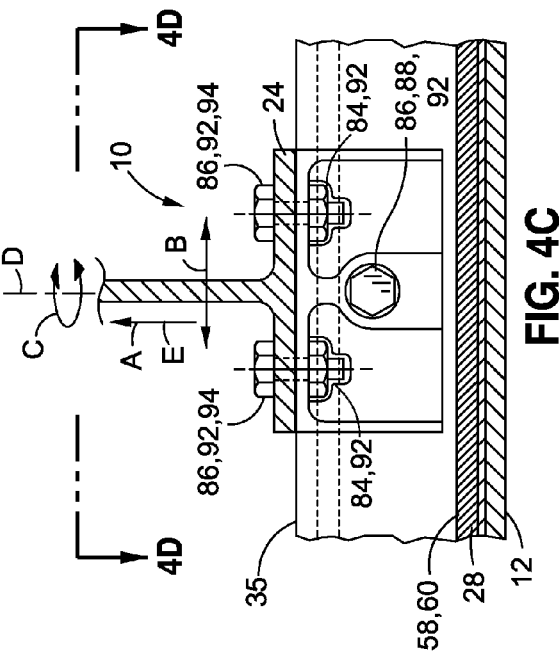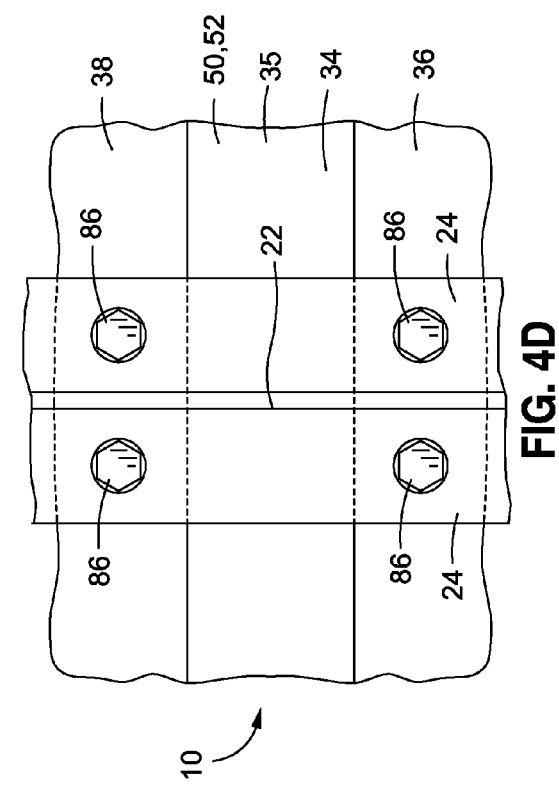

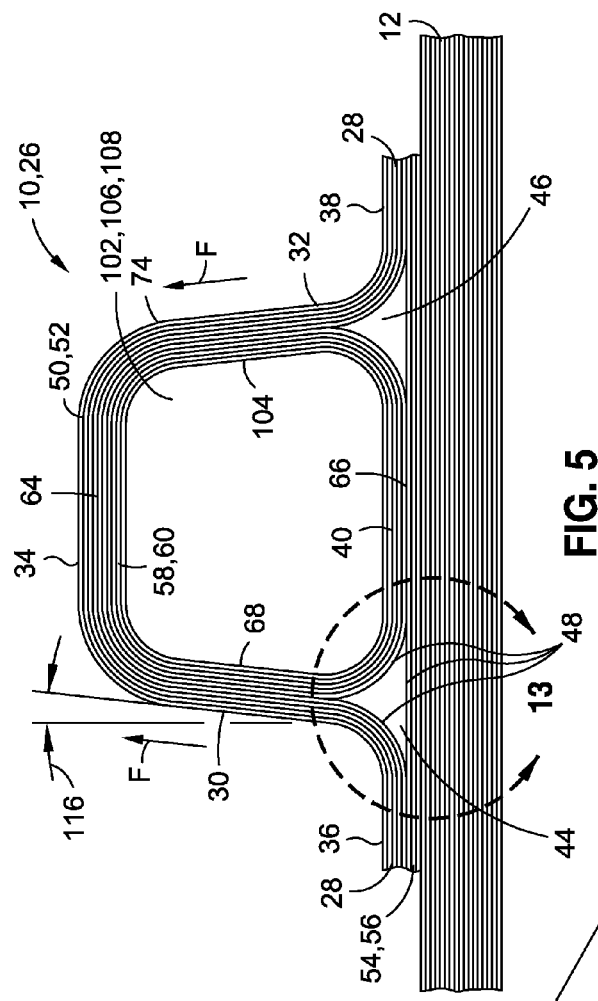
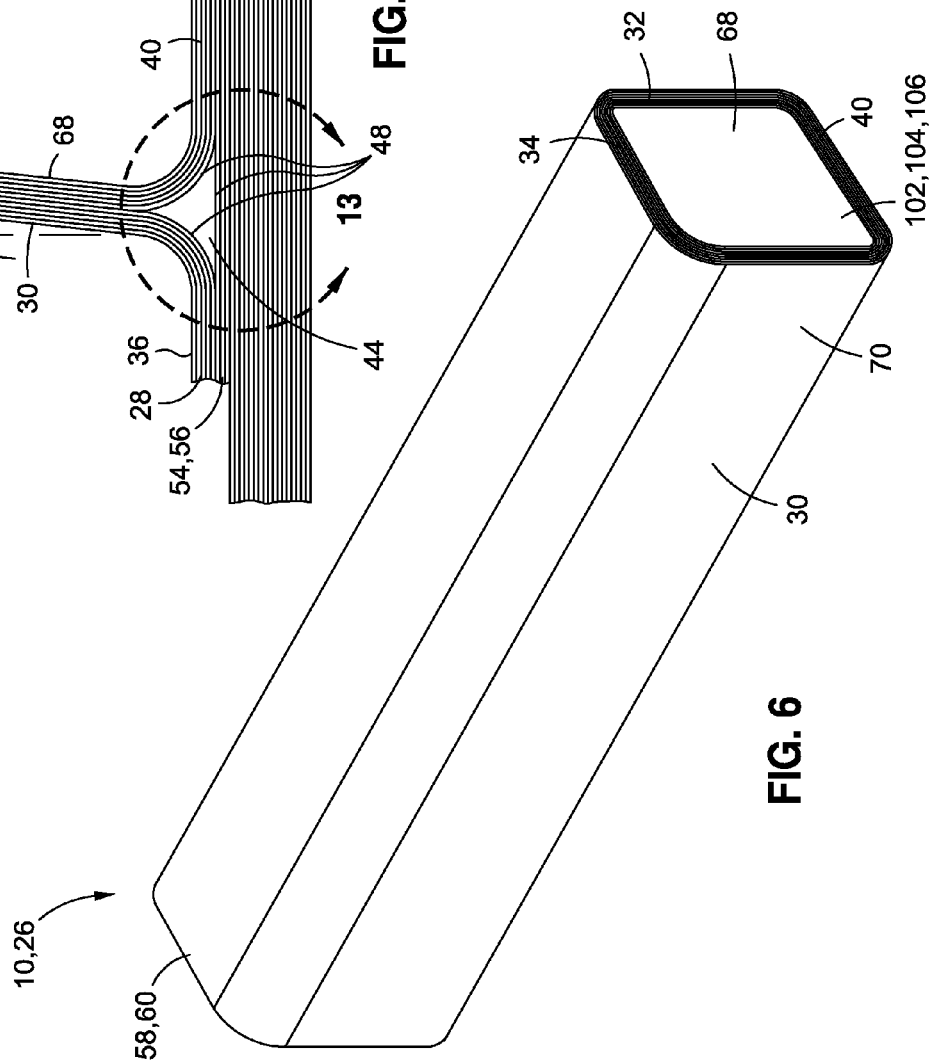

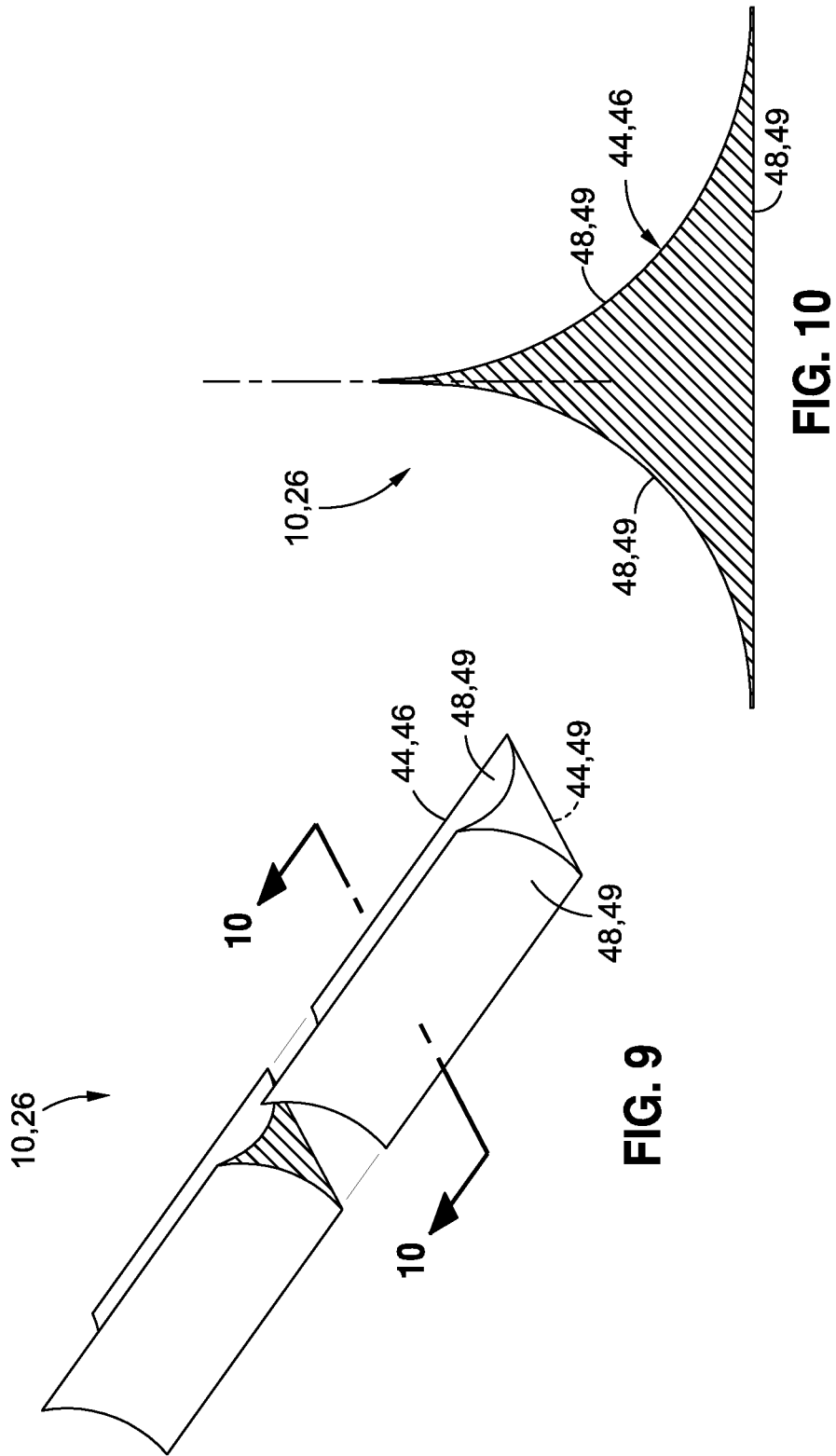

HIGH PULLOFF CAPABILITY HAT STRINGER

CROSS-REFERENCE TO RELATED APPLICATIONS

The present application is a divisional application of and claims priority to pending U.S. application Ser. No. 12/638,977 filed on Dec. 15, 2009, and entitled METHOD OF FABRICATING A HAT STRINGER, the entire contents of which is expressly incorporated by reference herein.

FIELD

The present disclosure relates generally to structures and, more particularly, to arrangements for interconnection of structural components for sustaining out-of-plane loads.

BACKGROUND

Aircraft structures must be capable of reacting loads in a variety of different directions. For example, an aircraft wing must be capable of reacting aerodynamic loads that are imposed on the wing during flight. Such aerodynamic loads include bending loads that are reacted by the wing skin and the internal wing structure. Bending loads are typically reacted by stiffeners or stringers in the internal wing structure. Stringers are coupled to the wing skin and generally extend in a span-wise direction along the wing interior. Stringers may be provided in a variety of different cross-sectional shapes and sizes including, but not limited to, an I-beam shaped cross section and/or a hat-shaped cross-section. A hat-shaped stringer includes a pair of webs which extend upwardly from a base portion of the stringer and are interconnected by a cap to enclose the hat-shaped cross-section.

The internal structure of a wing typically further includes a series of ribs which maintain the aerodynamic shape of the wings and/or assist in distributing loads that are imposed on the wings. Ideally, the wing ribs are interconnected to the stringers in order to increase the load carrying capability of the wing. One of the more structurally efficient arrangements for interconnecting the ribs to the stringers is by directly connecting the ribs to the hat-shaped stringers such as by mechanical attachment.

Although conventional metallic ribs may be directly connected to conventional metallic stringers at the stringer cap, hat stringers formed of composite materials may lack sufficient load-carrying capability to connect the rib to the cap due to the orientation of the loads relative to the length of the stringer. More specifically, pulloff loads are oriented in an out-of-plane direction or perpendicularly relative to the length of the stringer. Pulloff loads may occur as a result of operational loads and/or maneuver loads imposed on the wing structure. Operational loads may include overpressure loads resulting from the mass of the fuel in the wing tanks when the tanks are fully filled. Maneuver loads may include inertial loads resulting from movement of the fuel in the fuel tanks and from inertia acting on the mass of the fuel during certain aircraft maneuvers.

Because of an undesirably low pulloff capability of conventional wing stringers of composite construction, direct connection of the ribs to the stringer caps is avoided and the wing ribs are instead extended over and around the stringer cap and are directly mounted to the wing skin at the base of the stringer using shear ties. Although effective for their intended purposes, shear ties add significant weight to the aircraft due to the need for a shear tie at each location where a rib intersects with a stringer. The added weight of the shear ties at each rib-stringer intersection reduces the payload capacity of the aircraft and increases fuel consumption. In addition, the addition of a shear tie at each rib-stringer intersection increases manufacturing complexity, cost and production time.

As can be seen, there exists a need in the art for a system and method for directly connecting a rib to the cap of a stringer in order to obviate the need for an additional shear tie at each rib-stringer intersection. In this regard, there exists a need in the art for a system and method for connection of the ribs to the stringer cap in a manner that may sustain out-of-plane (i.e., pulloff) loads in an efficient manner. Ideally, the system for connecting the rib to the stringer cap is preferably low in cost, simple in construction and light in weight.

SUMMARY

The above-noted needs associated with connecting a rib to a stringer in a manner that is capable of reacting pulloff loads is addressed by a hat stringer and attachment method facilitating direct attachment of the rib to the cap or to the webs of the hat stringer. More specifically, disclosed is a structure comprising a skin member and a hat stringer that may be co-bonded or co-cured with the skin member. The hat stringer may include a base portion, a first web and a second web extending outwardly from the base portion. Each one of the first and second webs may be comprised of a wrap laminate having wrap plies and a cover laminate having cover. The hat stringer may further include the cap interconnecting the first and second webs.

In a further embodiment, disclosed is a composite structure comprising a skin member and a hat stringer co-cured with the skin member. The hat stringer may include a base portion and first and second webs extending outwardly from the base portion. Each one of the first and second webs may be comprised of a wrap laminate having wrap plies and a cover laminate having cover plies in substantially equal quantity to the wrap plies. A cap may interconnect the first and second webs. The hat stringer may include first and second noodles extending along the wrap laminate and cover laminate. The composite structure may include first and second brackets respectively mounted to the first and second webs by a stud extending therethrough. The composite structure may include a rib fastened to the first and second brackets.

Also disclosed is a method of fabricating a hat stringer comprising the steps of forming a wrap laminate by laying up wrap plies about a removable mandrel and forming a cover laminate by laying up cover plies on a cover mold. The method may include forming a base laminate by laying up base plies on a base mold and inserting the wrap laminate into the cover laminate. A first noodle and a second noodle may be placed along the wrap laminate and cover laminate. The base laminate may be applied to the wrap laminate and cover laminate such that the first and second noodles are captured between the wrap laminate, cover laminate and base laminate. The method may include mounting the hat stringer to a skin member and co-curing the skin member, wrap laminate, cover laminate and base laminate.

In a further embodiment, disclosed is a method of assembling a structure, comprising the steps of mounting a hat stringer to a skin member. The hat stringer comprises a wrap laminate and a cover laminate respectively including wrap plies and cover plies in substantially equal quantity. The method may include attaching a rib to the hat stringer.

Also disclosed is a method of assembling a composite structure comprising the steps of forming a hat stringer having first and second webs. The method may include the steps of forming a wrap laminate by laying up wrap plies about a removable mandrel formed complementary to the cover mold. A cover laminate may be formed by laying up cover plies on a cover mold such that the quantity of wrap plies and cover plies are substantially equivalent in the first and second webs. The method may include forming a base laminate by laying up base plies on a base mold, inserting the wrap laminate into the cover laminate, and placing a first noodle and a second noodle along the wrap laminate and cover laminate.

The base laminate may be added to the wrap laminate and cover laminate such that the first and second noodles are captured between the wrap laminate, cover laminate and base laminate. The hat stringer may be mounted to a skin member followed by co-curing the skin member, wrap laminate, cover laminate, base laminate and first and second noodles to form the composite structure. The method may further include mounting first and second brackets to respective ones of the first and second webs by extending a stud through the first and second webs and the first and second brackets. A rib may be mounted to the hat stringer by extending at least one fastener from the rib into each one of the first and second brackets. An electromagnetic effects (EME) resistant coating may be applied to the stud and fasteners.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3A is an enlarged sectional illustration of the rib interconnected to the stringer cap and illustrating a wrap laminate bonded to a cover laminate for forming the first and second webs and cap of the hat stringer;

FIG. 3B is a sectional illustration of the rib and hat stringer taken along line 3B-3B of FIG. 3A and illustrating a mechanical fastener extending through a flange of the rib and into the cap of the hat stringer;

FIG. 3C is a sectional illustration of the attachment of the rib to the cap of the hat stringer wherein the rib flange comprises a T-shaped cross-section that a pair of mechanical fasteners may be extended into the cap of the hat stringer;

FIG. 3D is a top view of the rib and hat stringer junction taken along line 3D-3D of FIG. 3C and illustrating the arrangement of the mechanical fasteners extended through the rib flange into the cap of the hat stringer;

FIG. 4A is an illustration of a further embodiment of the attachment of the rib to the hat stringer by means of first and second brackets respectively mounted to the first and second webs of the hat stringer;

FIG. 4B is a sectional illustration of the attachment of the rib to the hat stringer taken along line 4B-4B of FIG. 4A and illustrating the configuration of the first bracket having a generally solid or unitary structure through which extends an elongate stud through the first and second webs and into the second bracket;

FIG. 4C is a sectional illustration of the attachment of the rib to the hat stringer illustrating the first bracket in an alternative configuration facilitating receipt of standard fasteners which may be exteriorly accessible at opposite ends of the fastener;

FIG. 4D is a plan view of the attachment of the rib to the hat stringer taken along line 4D-4D of FIG. 4C and illustrating the arrangement of the mechanical fasteners extending through the rib flanges into the first and second brackets;

FIG. 5 is a sectional illustration of the hat stringer in an alternative embodiment having a generally orthogonal shape and illustrating a substantially equal quantity of wrap plies and cover plies that may make up the first and second webs and cap of the hat stringer;

FIG. 6 is a perspective illustration of the wrap laminate;

FIG. 9 is a perspective illustration of a first noodle which may be installed at the interface between the wrap laminate and cover laminate;

FIG. 10 is a sectional illustration of the first noodle taken along line 10-10 of FIG. 9;

DETAILED DESCRIPTION

Figure 1:
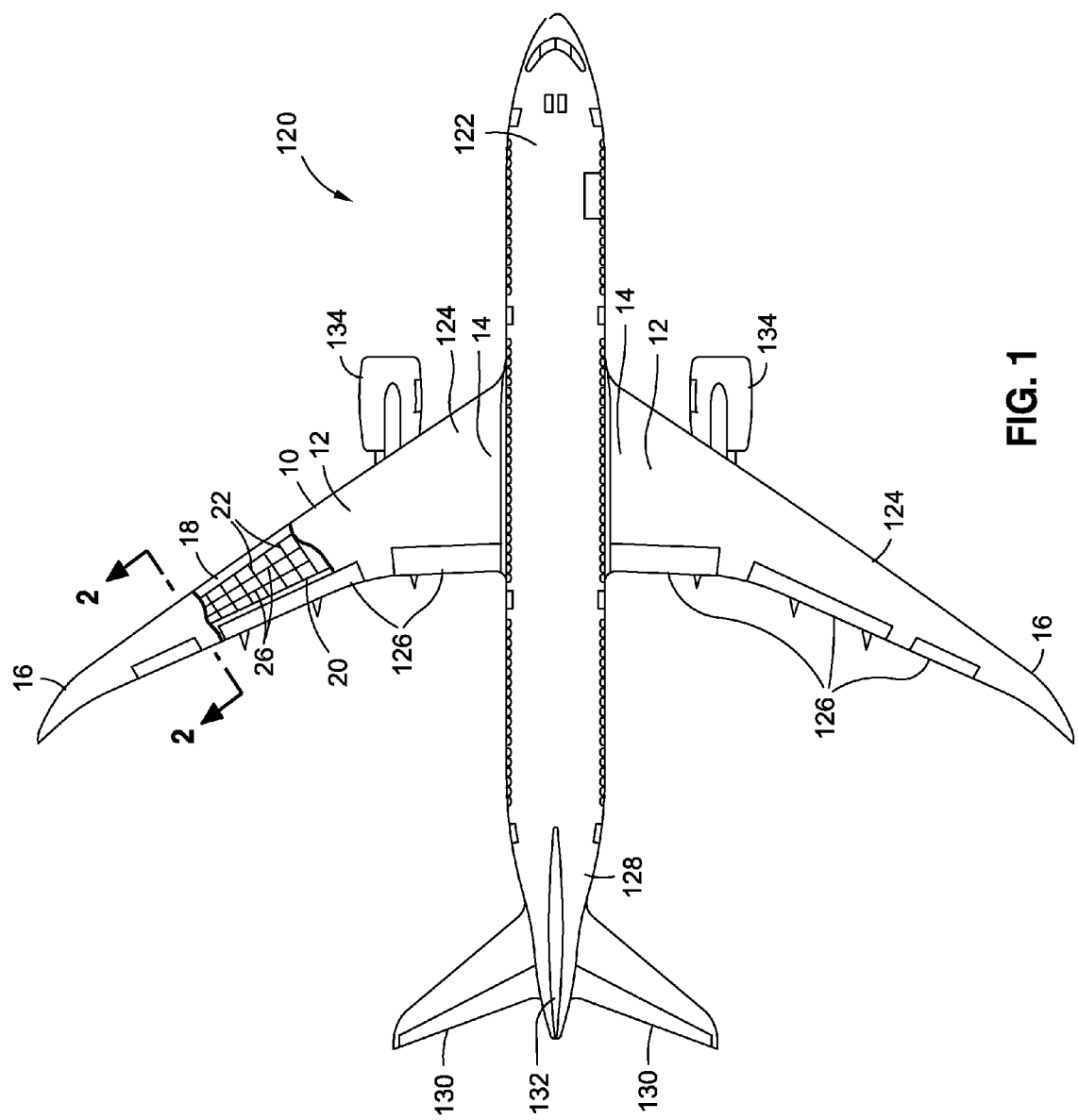
FIG. 1 is a top view of an aircraft having a wing which may include at least one stringer configured to facilitate direct attachment of the wing ribs to the stringer cap or stringer webs.

Referring now to the drawings wherein the showings are for purposes of illustrating preferred and various embodiments of the disclosure only and not for purposes of limiting the same, shown in FIG. 1 is a plan view of an aircraft 120 as an example of one of a variety of applications where a rib 22 or other structural member may be directly connected or attached to a hat stringer 26. As can be seen in FIG. 1, the aircraft 120 includes a pair of wings 124 extending outwardly from a fuselage 122. The aircraft 120 may include a tail section 128 having a horizontal stabilizer 130, a vertical stabilizer 132 and/or other control surfaces 126 normally associated with an aircraft 120 and one or more propulsion units 134. Each one of the wings 124 may include skin members 12 which may be internally supported by hat stringers 26 extending span-wise from an inboard 14 portion to an outboard 16 portion of the wing 124. The wing 124 may include a series of ribs 22 positioned in spaced relation to one another.

Advantageously, the hat stringer 26 as disclosed herein is configured to facilitate direct attachment of the ribs 22 to the cap 34 of the hat stringer 26 and/or to the pair of webs 30, 32 that extend upwardly from a base portion 28 of the hat stringer 26 to the cap 34. However, the hat stringer 26 as disclosed herein may facilitate direct connection of the hat stringer 26 to any one of a variety of elements wherein direct connection to the hat stringer 26 is desired. For example, the hat stringer 26 as disclosed herein may facilitate direct connection of the hat stringer 26 to frames (not shown) in the fuselage 122 and/or direct connection of the hat stringer 26 to ribs (not shown) in the horizontal stabilizer 130, vertical stabilizer 132 and control surfaces 126.

It should be noted that although the hat stringer 26 is illustrated with regard to attachment to a rib 22 such as an aircraft wing rib 22, the hat stringer 26 may be implemented in any one of a variety of different industries including, but not limited to, the automotive and marine industries and in an application including any vehicular or non-vehicular application. In this regard, the hat stringer 26 and rib 22 attachment system as disclosed herein may be implemented in any structural arrangement where attachment of a structural element to a stringer 26 is desired. In this regard, the rib 22 is representative of any one of a variety of structural components wherein direct attachment to a stringer 26 for sustaining pulloff loads is desired.

Figure 2:
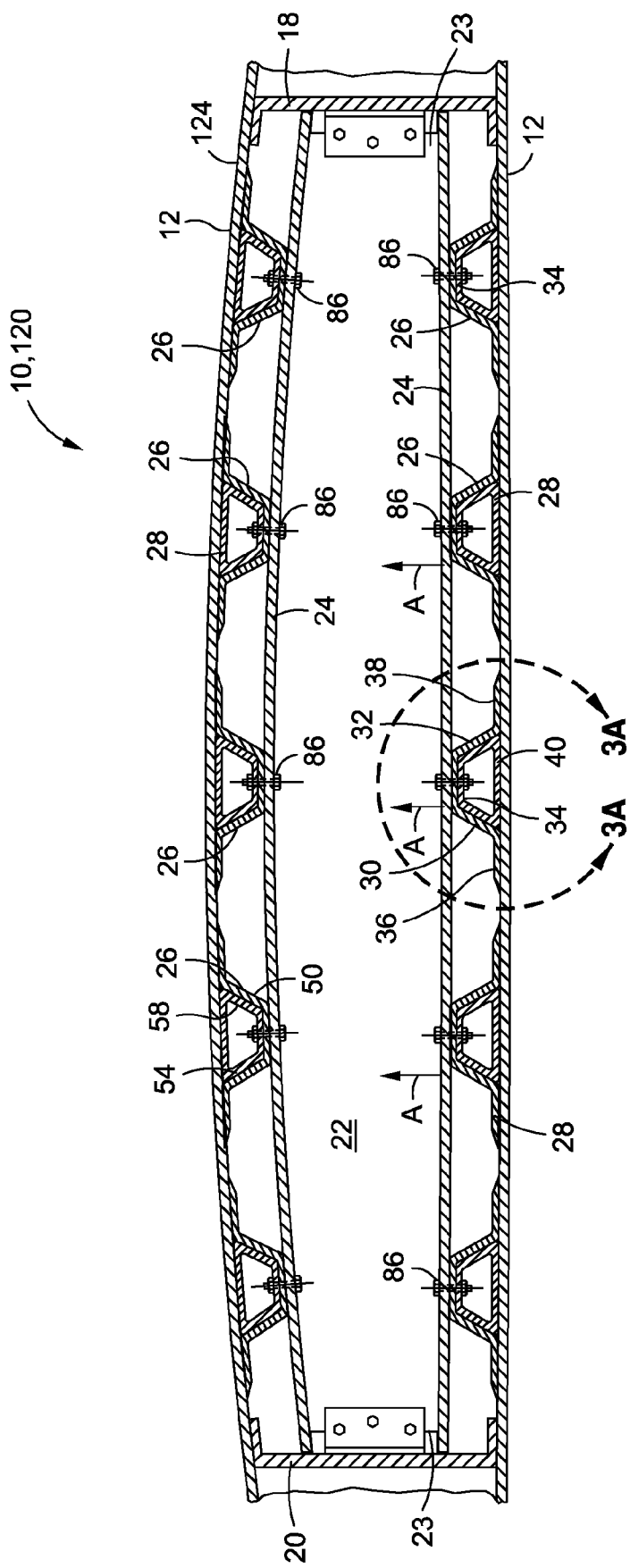
FIG. 2 is a sectional illustration of the wing taken along line 2-2 of FIG. 1 and illustrating a rib of the wing being directly connected to a plurality of hat section stringers at the stringer cap.

Referring to FIG. 2, shown is an enlarged partial sectional illustration of a structure 10 such as the wing 124 illustrated in FIG. 1. As can be seen in FIG. 2, the wing 124 may comprise upper and lower skin members 12 to which a plurality of hat stringers 26 may be attached. The wing 124 may include a front spar 18 and a rear spar 20 to which the rib 22 may be secured at opposing ends 23 of the rib 22. The rib 22 in FIG. 2 is illustrated as having at least one rib flange 24 on each of the upper and lower edges of the rib 22. The rib flange 24 of the rib 22 may be directly attached to the cap 34 of the hat stringer 26 such as, without limitation, by installation of a blind fastener through the rib flange 24 and into the cap 34 as illustrated in FIGS. 2 and 3A-3D. However, the rib 22 may also be mechanically fastened to one or more of the webs 30, 32 of the hat stringer 26 by means of brackets 80, 82 as illustrated in FIGS. 4A-4D and as described in greater detail below.

Referring to FIGS. 3A-3D, shown are enlarged sectional and top view illustrations of the attachment of the rib 22 to the cap 34 of the hat stringer 26. As shown in FIG. 3A, the rib 22 includes a rib flange 24 which extends laterally outwardly from the rib 22 and which is disposed in contacting relation with a top surface 35 of the cap 34 of the hat stringer 26. The cap 34 interconnects a first web 30 of the hat stringer 26 to a second web 32. The first and second webs 30, 32 extend upwardly and/or outwardly from a base portion 28 of the hat stringer 26.

Each one of the first and second webs 30, 32 may be comprised of a wrap laminate 58 mated to a cover laminate 50. The wrap laminate 58 and cover laminate 50 may be formed of a substantially equal quantity of plies of composite material such as, without limitation, graphite-epoxy prepreg. By providing a substantially equal quantity of plies in the wrap laminate 58 and cover laminate 50, the load carrying capability of the first and second webs 30, 32 may be increased relative to a non-equivalent quantity of plies. In this manner, the substantially equal quantity of plies in the wrap laminate 58 and cover laminate 50 may substantially evenly distribute the loads into the plies of each one of the wrap laminate 58 and cover laminate 50. Furthermore, each one of the first and second webs 30, 32 includes a respective first noodle 44 and second noodle 46 which may be adhesively bonded to the wrap laminate 58 and cover laminate 50. The first 44 and second noodles 46 facilitate an efficient transfer of load such as pulloff loads A from the rib 22 to the base portion 28 of the stringer. In this regard, the substantially equal quantity of plies in the wrap laminate 58 and cover laminate 50 in combination with the incorporation of the first and second noodles 44, 46 represents an improvement in pulloff load A transfer capability in the out-of-plane direction E as compared to the load transfer capability of a stringer having an I-shaped or T-shaped cross-section and which includes only a single noodle.

As can be seen in FIG. 3A, the hat stringer 26 as disclosed herein includes first and second flanges 36, 38, respectively, on opposing sides of the hat stringer 26. The first flange 36 intersects the first web 30. The second flange 38 intersects the second web 32. Each one of the first and second flanges 36, 38 is formed of the cover laminate 50 and a base laminate 54. The base laminate 54 extends between the first and second flanges 36, 38 and is mounted to the skin member 12. The first and second flanges 36, 38 in combination with the base laminate 54 form the base portion 28 of the hat stringer 26. The area between the first and second flanges 36, 38 comprises a base center 40 of the hat stringer 26 and is collectively defined by a center portion 58a (FIGS. 3A and 4A) of the wrap laminate 58 and a center portion 54a (FIGS. 3A and 4A) of the base laminate 54. In an embodiment disclosed herein, the hat stringer 26 may be co-cured with the skin member 12. Alternatively, the hat stringer 26 may be co-bonded with the skin member 12 after separately curing the hat stringer 26 and the skin member 12 as described in greater detail below.

Referring to FIG. 3A-3B, the rib 22 can be seen as being attached to the cap 34 of the hat stringer 26. Although the rib 22 is illustrated in FIG. 3B as comprising a C-shaped cross section and in FIG. 3C as an I-shaped cross section, the rib 22 may be formed in any number of alternative cross sectional shapes without limitation. For example, the rib 22 may be formed in a J-shaped or Z-shaped cross section. The rib 22 may include one or more rib flanges 24 that may be attached to the cap 34 of the hat stringer 26 by means of at least one fastener 86 which may extend from a rib flange 24 into the cap 34. In this regard, the mechanical fastener 86 illustrated in FIG. 3A extends from the rib flange 24 through the cover laminate 50 and wrap laminate 58 which make up the cap 34 of the hat stringer. Due to the inaccessibility of the interior of the wrap laminate, the fastener 86 may be configured as a blind fastener 90 as known in the art wherein the fastener 86 may be inserted through the rib flange 24 and cap 34 after which the end of the fastener 86 inside the hat stringer 26 may be expanded such as in response to rotation of the fastener 86.

Alternatively, a nutplate (not shown) may be mounted to a top inner surface 58b (FIGS. 3A-3C) of the wrap laminate 58. In a further embodiment, a nut 84 may be installed on the bolt 94 as shown in FIG. 3B wherein the nut 84 may be transported along the length of the stringer 26 on an interior thereof by use of a robotic device (not shown) capable of locating and attaching the nut 84 to a bolt 94. Preferably, the fastener 86 may also include provisions for resistance against electromagnetic effects (EME). In this regard, the fastener 86 may include an EME coating 92 or other treatment of the end of the fastener 86 to mitigate or eliminate the risk of electrical arcing such as may otherwise occur in response to transient charge traveling through the rib 22 and/or stringer 26. In a further embodiment, the rib 22 may be bonded (not shown) to the top surface 35 of the hat stringer 26 to obviate the need for mechanical fasteners. However, mechanical fasteners may be installed in combination with bonding of the hat stringer 26 to the rib 22.

Referring to FIG. 3B, shown is a sectional illustration of the attachment of the rib 22 to the cap 34 of the hat stringer 26. In the embodiment illustrated in FIG. 3B, the rib 22 includes a single rib flange 24 extending laterally outwardly from the rib 22 and through which the mechanical fastener 86 such as a blind fastener 90 or bolt 94 is inserted. It can be seen that the rib flanges 24 are in direct contact with the top surface 35 of the cap 34 of the hat stringer 26. A nut 84 may be fastened to the bolt 94 and an EME coating 92 may be applied to the nut 84 and/or bolt 94 of the fastener 86.

Referring to FIG. 3C, shown is the rib 22 in an embodiment having an I-shape flange configuration wherein a pair of the rib flanges 24 extend laterally outwardly from the rib 22. However, as is indicated above, the rib 22 may be formed in any one of a variety of alternative cross-sectional shapes, without limitation, and is not limited to the I-shaped cross section illustrated in FIG. 3C. The rib 22 may include one or more rib flanges 24 that may be attached to the cap 34 of the hat stringer 26 In this regard, the configuration of the rib 22 illustrated in FIG. 3C facilitates installation of at least a pair of fasteners 86 such as in a symmetrical arrangement in order to eliminate eccentric loading of the rib flange 24.

Furthermore, the first and/or second brackets 80, 82 may be bonded to respective ones of the first and/or second webs 30, 32 and or to the rib 22 as indicated above. Such bonding may optionally be in combination with mechanical fasteners 86 to attach the rib 22 to the hat stringer 26. The rib 22 configuration illustrated in FIG. 3C may further facilitate resistance to rotational or twisting C motion of the rib 22 such as about the axis of rotation D relative to the hat stringer 26 as a result of the pair of fasteners 86 extending through the rib flanges 24 on each side of the rib 22. In addition, the embodiments of the attachment of the rib 22 to the hat stringer 26 illustrated in FIGS. 3B and 3C are capable of resisting movement or loads along the longitudinal B direction as well as having the capability to react pulloff loads A in the out-of-plane direction E.

Referring to FIG. 3D, shown is a top view of the rib 22 attachment to the hat stringer 26 illustrating the relative spacing and positioning of the fasteners 86 on opposite sides of the rib 22 and extending through the flange 24 into the cap 34. Although a pair of fasteners 86 are illustrated in FIGS. 3C-3D, any number of fasteners 86 may be provided for attaching the rib 22 to the hat stringer 26 cap 34.

Referring to FIGS. 4A-4D, shown is an arrangement for attaching the rib 22 to the hat stringer 26 in an alternative embodiment wherein the rib 22 may be attached to at least one of the first and second webs 30, 32. More particularly, FIG. 4A illustrates an arrangement wherein the hat stringer 26 may include first and second brackets 80, 82 which may be respectively mounted to the first and second webs 30, 32 on an exterior side thereof. A fastener 86 such as a stud 88 having threaded ends may be extended through the first and second webs 30, 32 and through the first and second brackets 80, 82 in order to secure the rib 22 to the hat stringer 26. The rib 22 is secured to at least one of the first and second brackets 80, 82 by means of at least one fastener 86 which may extend from the rib flange 24 into one or both of the first and second brackets 80, 82.

As shown in FIGS. 4A-4B, the fastener 86 extending from the rib flange 24 into the first and second brackets 80, 82 may comprise a nut 84 and bolt 94 combination or any other suitable fastener arrangement. The first and second brackets 80, 82 may be formed in a wedge shaped configuration as illustrated in FIG. 4A wherein the first bracket 80 may have an inner face 82*a* which may be formed or angled complementary to the first web 32. Although shown in a wedge shaped configuration in FIG. 4A, the and second brackets 80, 82 may be formed in any one of a variety of alternative shapes and sizes for connecting the rib 22 to the first and/or second webs 32, 34. The second bracket 82 may include an inner face 82*a* which may be formed complementary to the second web 32. The first and second brackets 80, 82 may be formed with respective outer faces 80*b*, 82*b* which are preferably oriented substantially parallel to one another and substantially perpendicularly relative to the axis of the fastener 86 or stud 88 extending through the first and second brackets 80, 82 and first and second webs 30, 32. The substantially perpendicular orientation of the outer faces 80*b*, 82*b* of the respective first and second brackets 80, 82 may facilitate proper seating of a threaded nut, collar or other mechanical feature to engage the threaded ends of the stud 88.

Referring still to FIGS. 4A-4B, each one of the first and second brackets 80, 82 may likewise include respective mounting pads 80*c*, 82*c* which are configured to be placed in contact with the rib 22 and, more particularly, with an underside of the rib flange 24. In an embodiment, the mounting pads 80*c*, 82*c* of the first and second brackets 80, 82 may be positioned to be in general alignment with the upper surface of the cap 34 such that the rib flange 24 is in bearing contact across the mounting pads 80*c*, 82*c* and the cap 34. In this manner, compression loads exerted by the rib 22 onto the hat stringer 26 may be uniformly distributed over a relatively large surface area. The stud 88 preferably extends through a close tolerance hole or bore in the first and second brackets 80, 82 and first and second webs 30, 32 in order to distribute pulloff loads A from the rib 22 to the hat stringer 26. As indicated, the pulloff loads A are oriented in an out-of-plane direction E opposite or away from the hat stringer 26. For EME protection, it is further contemplated that the exposed ends of the fastener 86 or stud 88 extending outwardly from each of the outer faces 80*b*, 82*b* of the first and second brackets 80, 82 may be coated with an EME resistant coating 92 or other suitable treatment.

Referring to FIG. 4B, shown is a cross-sectional illustration of the rib 22 having a T-shaped flange configuration. The first and second brackets 80, 82 may be configured to receive a pair of the fasteners 86 extending from flanges of the rib 22 on the opposite sides of the rib 22. The stud 88 which extends laterally through the first and second brackets 80, 82 and the first and second webs 30, 32 may be positioned in a centralized location relative to the rib 22 and/or relative to the fasteners 86. The fasteners 86 may comprise nut 84 and bolt 94 combinations although the fastener 86 may comprise any other suitable fastener configuration. Advantageously, the combination of dual fasteners 86 extending through the flanges 24 on each side of the rib 22 prevents rotation of the rib 22 about the axis of rotation D relative to the hat stringer 26 in addition to providing resistance against pulloff loads A in the pulloff direction E and longitudinal B direction as illustrated in FIG. 4C.

Referring to FIG. 4C, shown is the attachment of the rib 22 to the hat stringer 26 wherein the first and second brackets 80, 82 may be provided in a configuration to facilitate access to the exposed ends of the fasteners 86 comprising the nut 84 and bolt 94 combination. The arrangement of the first and second brackets 80, 82 illustrated in FIG. 4C facilitates the installation of the nut 84 or other feature on the end of the bolt 94 extending from the rib 22. In this regard, it should be noted that the bracket configurations illustrated in FIGS. 4A-4D are exemplary only and are not to be construed as limiting alternative configurations. In this regard, the first and second brackets 80, 82 may be provided in any suitable configuration facilitating the receipt of one or more mechanical fasteners from the rib into the bracket and which facilitates transfer of load from the bracket into the first and second webs 30, 32 by means of the stud 88 extending through the first and second brackets 80, 82. It should also be noted that only a single one of the first and second brackets 80, 82 may be provided and/or may be interconnected to the rib 22. Referring to FIG. 4D, shown is an arrangement of the fasteners 86 which extend from the flanges 24 on opposing sides of the rib 22 into the first and second brackets 80, 82. Although shown as including a single fastener 86 extending through each one of the rib flanges 24, any number of fasteners 86 may be provided.

Referring to FIG. 5, shown is an embodiment of the hat stringer 26 as may be mounted or coupled to the skin member 12 and wherein the hat stringer 26 is illustrated as having a slightly tapered orthogonal configuration as compared to a generally trapezoidal configuration illustrated in FIGS. 3A-4D as described above. In this regard, the configuration of the hat stringer 26 illustrated in FIG. 5 may include a draft angle 116 of the outer cover surface 74 of the first and second webs 30, 32 to facilitate removal of the cover laminate 50 from a cover mold 110 during the forming process as will be described in greater detail below. As can be seen in FIG. 5, the hat stringer 26 includes the cover laminate 50 and wrap laminate 58 which collectively define the first and second webs 30, 32 and the cap 34. Advantageously, each one of the first and second webs 30, 32 is comprised of the wrap laminate 58 having wrap plies 60 and the cover laminate 50 having cover plies 52 which are substantially equal in quantity to the wrap plies 60. In this manner, load which is oriented along a web load direction F parallel to the first and second webs 30, 32 is distributed substantially evenly through the wrap and cover plies 60, 52 in the first and second webs 30, 32 and which increases the pulloff capability of the hat stringer 26. Advantageously, the first and second noodles 44, 46 further improve the load carrying capabilities of the hat stringer 26 in the out-of-plane direction E (FIGS. 4A-4C).

Each one of the first and second noodles 44, 46 acts as a radius filler at the intersections of the wrap laminate 58, cover laminate 50, and base laminate 54. For example, the first noodle 44 is installed at the intersection of the first web 30 with the first flange 36. Likewise, the second noodle 46 is installed at the intersection of the second web 32 with the second flange 38. The first noodle 44 may be provided in mirrored arrangement to the second noodle 46 in consideration of the draft angle 116 that may be included in each of the first and second webs 30, 32. The first and second noodles 44, 46 may be formed of composite material by any suitable means including, but not limited to, pultrusion, extrusion, hand layup or any other suitable forming process as described in greater detail below.

As shown in FIG. 5, the base laminate 54 may mate with the first flange 36, second flange 38 and wrap laminate 58. More particularly, the base laminate 54 may mate with the first flange 36 and second flange 38 at a wrap-base interface 66. Likewise, the base laminate 54 may mate with the wrap laminate 58 at a wrap-base interface 66 illustrated as the base center 40 in FIG. 5. The base laminate 54 may comprise any number of plies including a single ply and is not limited to being formed of a quantity of plies substantially equal in number to either the wrap plies 60 or the cover plies 52.

Referring to FIG. 6, shown is the wrap laminate 58 which may be formed by laying up wrap plies 60 around a mandrel 102 such as a bladder 106 and/or a foam mandrel or any other suitable mold for forming the wrap laminate 58 in the desired size, shape and configuration. For an inflatable mandrel 102, the wrap laminate 58 may be formed by laying up the wrap plies 60 about the inflatable mandrel 102. The mandrel 102 may be retained within the wrap laminate 58 during curing and/or bonding operations and may be removed by deflating the mandrel 102 following curing of the wrap plies 60 and/or following bonding of the wrap laminate 58 to the cover laminate 50, base laminate 54 and/or skin member 12. The wrap laminate 58 may include an inner wrap surface 68 and an outer wrap surface 70. The inner wrap surface 68 is defined by the shape of the mandrel side walls 104 of the mandrel 102.

Figure 7:
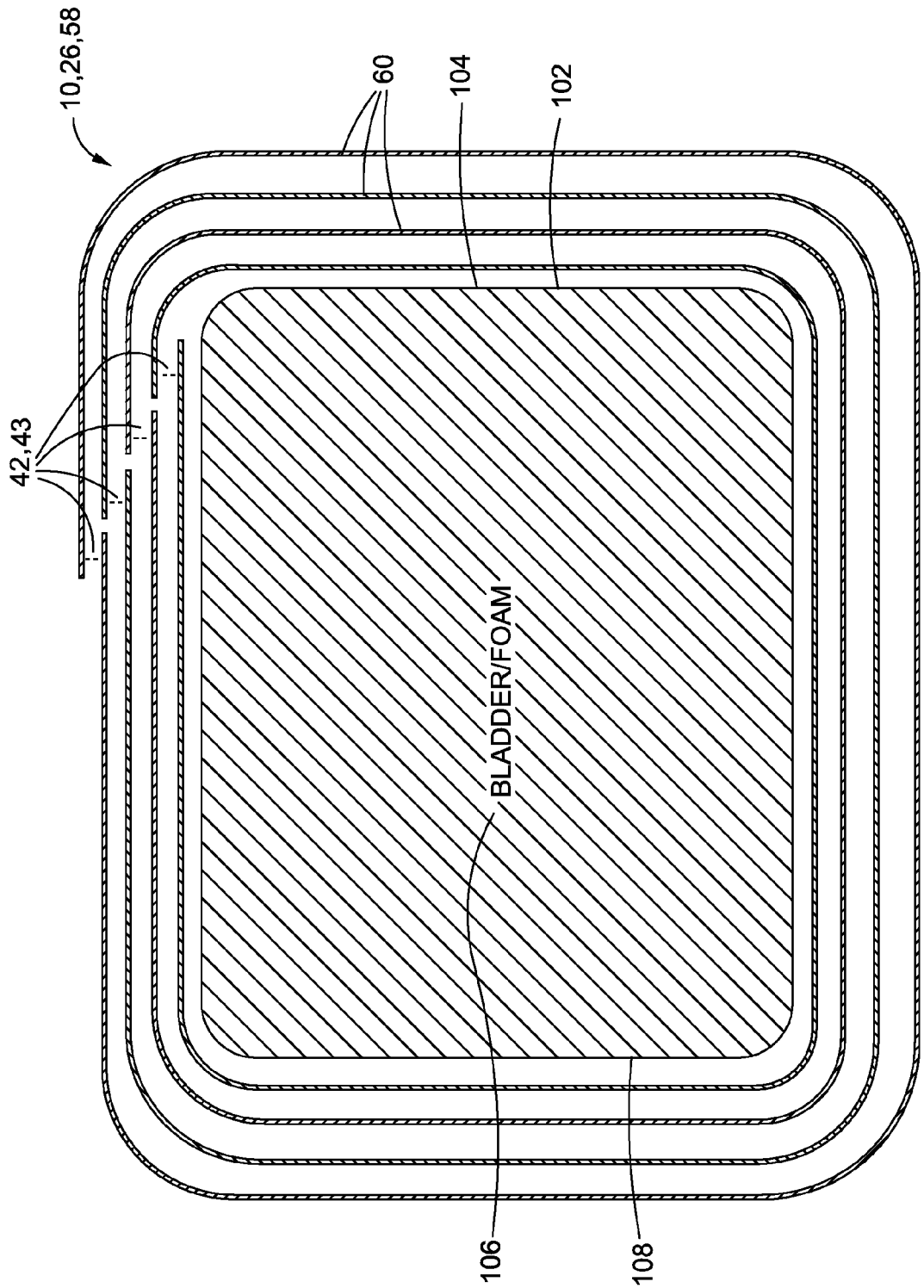
FIG. 7 is a sectional illustration of the wrap laminate illustrating wrap splices of a portion of the quantity of wrap plies that may make up the wrap laminate.

Referring to FIG. 7, shown is a cross section of the wrap laminate 58 having the wrap plies 60 formed about the mandrel 102 which may be comprised of any suitable mandrel 102 configuration including, but not limited to, an expandable mandrel 102 or bladder 106 or a mandrel 102 formed of foam 108 as mentioned above. The foam 108 may be removable from the mandrel 102 following forming of the wrap laminate 58. As can be seen in FIG. 7, the wrap plies 60 may be layered in relation to one another such that a plurality of lap splices 42 are oriented along an axial direction of the wrap laminate 58 in FIG. 7 (i.e., into the plane of the paper). The wrap laminate 58 may be formed such that the wrap plies 60 fall within a location of the cap 34 of the stringer 26 as opposed to falling within a location of the first web 30 and/or second web 32 of the hat stringer 26.

However, it is contemplated that the lap splices 42 of the wrap laminate 58 may be positioned to fall at any location of the hat stringer 26 including at the base center of the hat stringer 26 and/or the first and second web 30, 32 of the hat stringer 26 or any combination thereof. The extent of overlap 43 of the lap splices 42 is preferably in proportion to the total quantity of wrap plies 60. In this regard, the spacing between the lap splices 42 as shown in FIG. 7 is preferably evenly distributed across the width of the cap 34 which may be defined as the distance between the first and second web 30, 32 of the hat stringer 26. Furthermore, the spacing between the lap splices 42 may be linear or may be nonlinear and may vary at any portion across a width of the cap 34. Even further, the spacing between the lap splices 42 of the wrap plies 60 may be uniformly distributed along any one of the first and second web 30, 32 or along the base center 40 or any combination thereof.

Figure 8:
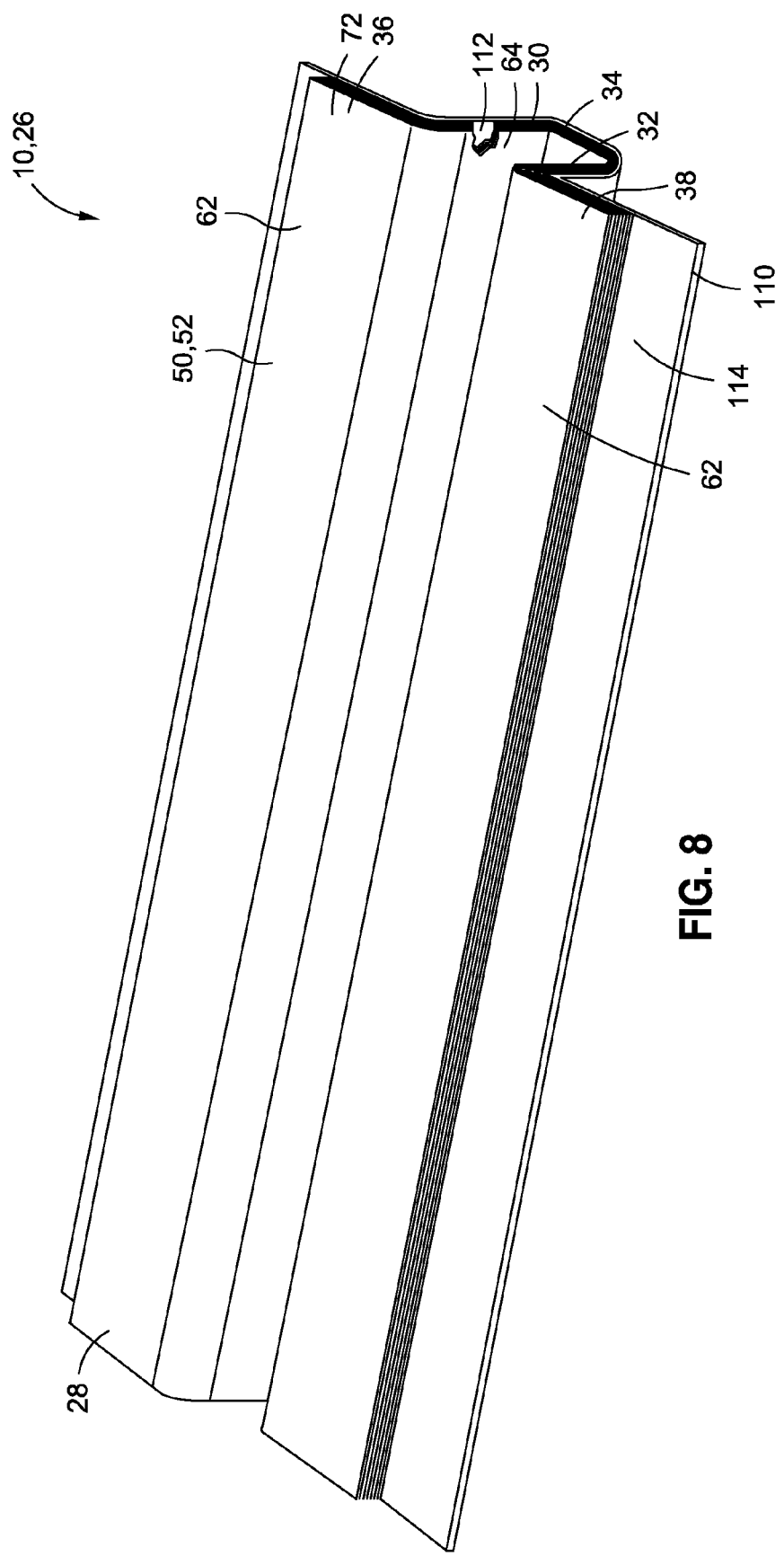
FIG. 8 is a perspective illustration of the cover laminate flipped vertically relative to the orientation shown in FIG. 5.

Referring to FIG. 8, shown is a perspective illustration of the cover laminate 50 flipped vertically and mounted on a cover mold 110 for laying up the cover laminate 50. More specifically, FIG. 8 illustrates a plurality of cover plies 52 which make up the cover laminate 50 and which are shown in exaggerated thickness in order to illustrate the layup of the cover plies 52 on the cover mold 110. The inner cover surface 72 of the cover laminate 50 assumes the shape of the cover mold surface 114 and cover mold side walls 112. The cover plies 52 may by provided in any desired stacking sequence including desired ply orientations tailored to the magnitude and direction of the loads sustained by the hat stringer 26. As was described earlier, the cover laminate 50 comprises at least a portion of the first and second flanges 36, 38 which make up the base portion 28. Likewise, the cover laminate 50 comprises at least a portion of the first and second webs 30, 32. In this regard, the cover laminate 50 is combined with the wrap laminate 58 as illustrated in FIG. 11, and described below, in order to form the first and second webs 30, 32 and the cap 34 of the hat stringer 26.

Referring to FIG. 9, shown is a perspective illustration of one of the first and second noodles 44, 46. As was indicated earlier, each one of the first and second noodles 44, 46 at least substantially fills the radius at the junction of the wrap laminate 58 (FIG. 5), cover laminate 50 (FIG. 5), and base laminate 54 (FIG. 5). In this regard, the first and second noodles 44, 46 facilitate the transfer of pulloff loads A in the out-of-plane E direction as illustrated in FIGS. 3A-3C and 4A-4C. The first and second noodles 44, 46 may be separately formed as individual components which are then later assembled with the wrap laminate 58 (FIG. 5), cover laminate 50 (FIG. 5), and base laminate 54 (FIG. 5). In order to facilitate attachment of the first and second noodles 44, 46 to the respective first and second web 30, 32 and first and second flanges 36, 38, adhesive 48 may be applied to each one of the faces 49 prior to assembling the laminates 50, 54, 58. Such adhesive 48 may be applied to the three faces 49 of each of the first and second noodles 44, 46 as best seen in FIG. 10. Adhesive 48 may be applied in any suitable manner and in any suitable configuration. For example, the adhesive 48 may be applied in strips by hand to the faces 49 of the first and second noodles 44, 46. However, the adhesive 48 may be applied in any suitable manner such as in liquid form or in any other arrangement.

Figure 11:
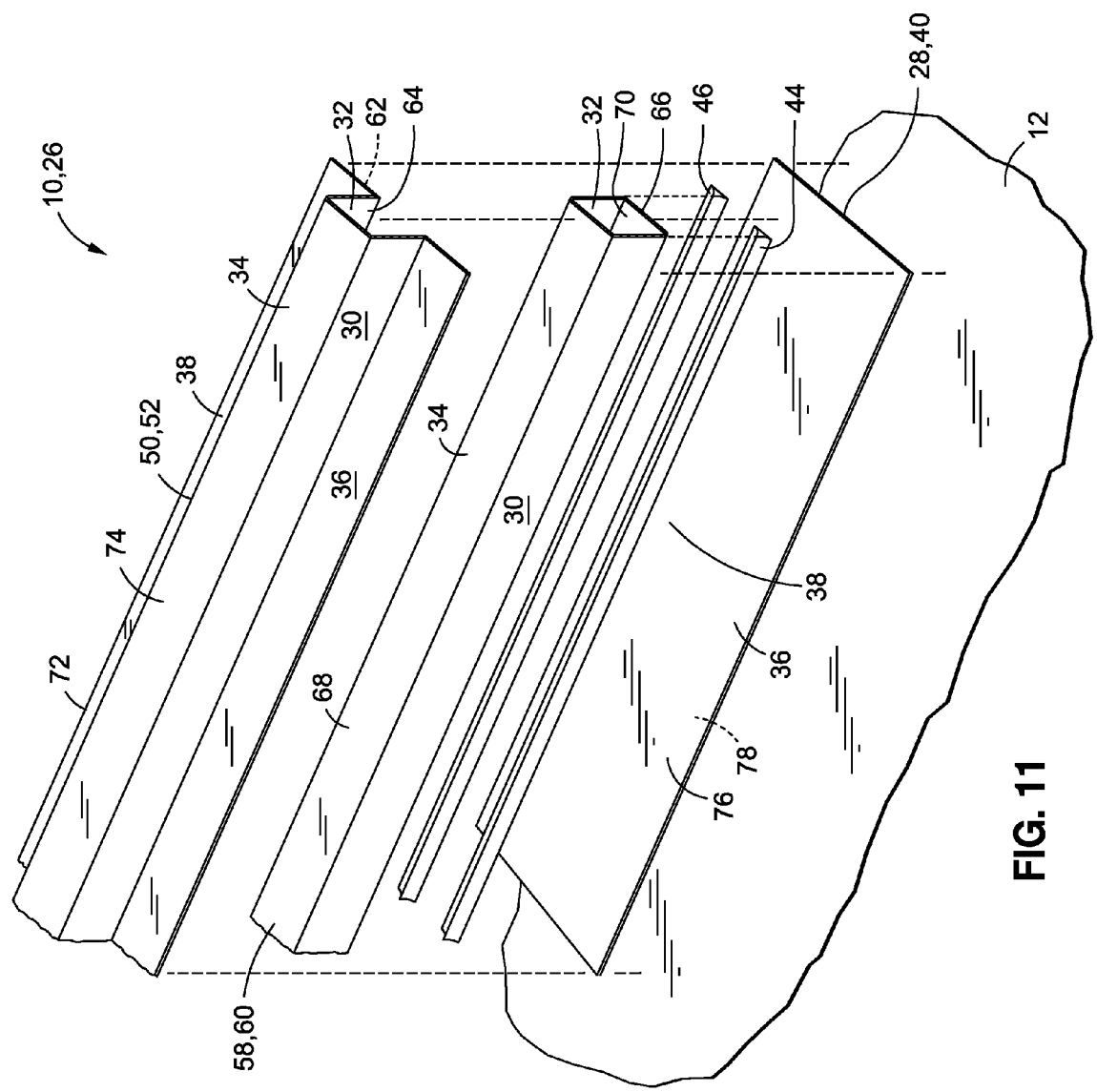
FIG. 11 is an exploded perspective illustration of the hat stringer illustrating the interconnectivity of the cover laminate, wrap laminate, first and second noodles, base laminate and skin member to which the hat stringer may be co-cured.

Referring to FIG. 11, shown is an exploded perspective illustration of the hat stringer 26 and skin member 12 and illustrating the interconnectivity of the cover laminate 50, wrap laminate 58, first and second noodles 44, 46, base laminate 54 and skin member 12. The base laminate 54 includes an inner base surface 76 which mates with the inner cover surface 72 of the cover laminate 50. The outer base surface 78 of the base laminate 54 mates with the skin member 12. As was earlier indicated, the hat stringer 26 may be assembled and may be co-cured such as in an autoclave under a pressure bagging operation as is known in the art. Furthermore, the hat stringer 26 comprising the wrap laminate 58, cover laminate 50, first and second noodles 44, 46 and base laminate may be separately cured and then may be bonded to a fully cured skin member 12 in order to form a composite structure 10 suitable for use in the application such as the aircraft 120 wing 124 illustrated in FIG. 1. In this regard, FIG. 11 illustrates a configuration of each one of the laminates 50, 54, 58 and the first and second noodles 44, 46 prior to assembling for co-curing or co-bonding to form the hat stringer 26.

Figure 12:
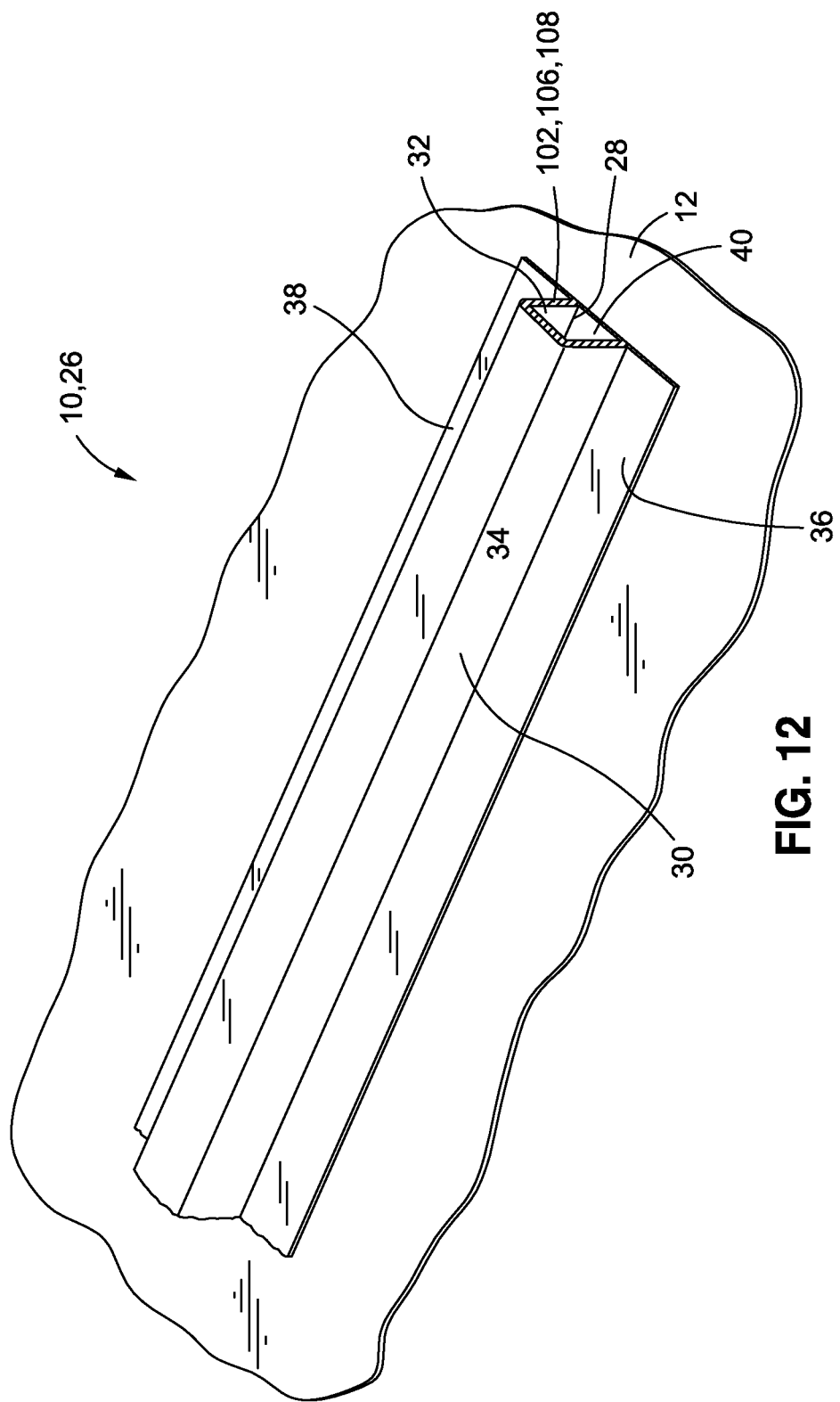
FIG. 12 is a perspective illustration of the hat stringer secured to the skin member such as after co-curing or co-bonding thereto.

Referring to FIG. 12, shown is a perspective illustration of the hat stringer 26 attached to the skin member 12 such as by co-bonding and/or co-curing. As was indicated above, each one of the wrap laminate 58, cover laminate 50, base laminate 54 and first and second noodles 44, 46 may be consolidated in order to remove volatiles and reduce the volume of each one the respective laminates 50, 54, 58 prior to assembly for co-bonding and/or co-curing. In this regard, each one of the laminates 50, 54, 58 may be partially cured into a B-stage and later fully cured when the laminates 50, 54, 58 and/or skin member 12 are assembled. The laminates 50, 54, 58 may also be cured in an assembled state following installation of the first and second noodles 44, 46. The entire assembly may be vacuum-bagged for consolidating the laminates and/or for partially curing the hat stringer 26 prior to assembly and final curing with the skin member 12.

Figure 13:
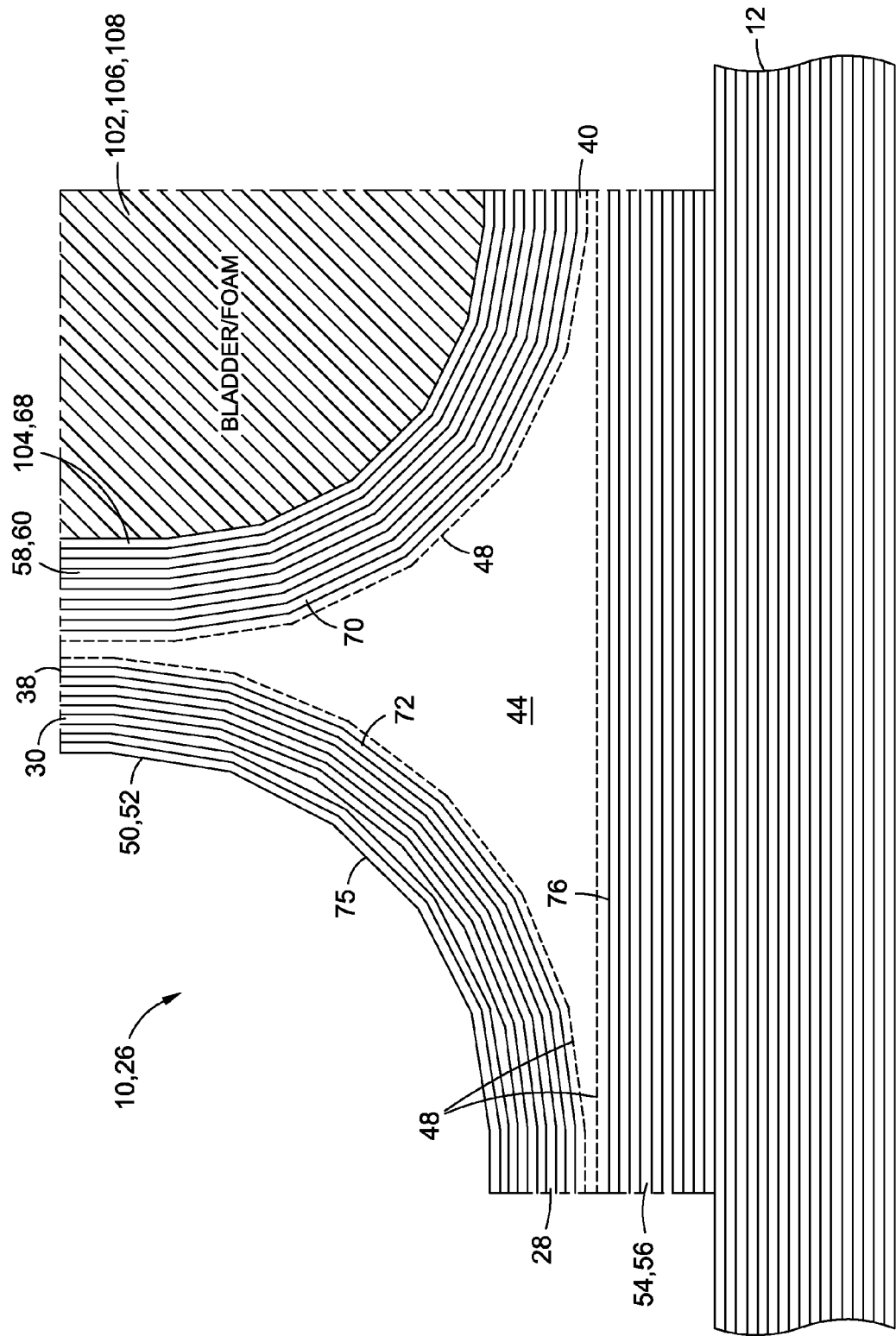
FIG. 13 is a sectional illustration of the intersection of the wrap laminate, cover laminate, base laminate, first noodle and skin member as may be co-cured and/or co-bonded.

Referring to FIG. 13, shown is an enlarged partial sectional illustration of the intersection of the wrap laminate 58, cover laminate 50 and base laminate 54 at the first noodle 44. As can be seen, the first noodle 44 may interface with the respective ones of the wrap laminate 58, cover laminate 50 and base laminate 54 with a layer of adhesive 48 to facilitate bonding of the first noodle 44 to the hat stringer 26. FIG. 13 further illustrates the substantially equal quantity of plies (i.e., wrap plies 60 and cover plies 52) that make up the first web 30 of the hat stringer 26. The skin member 12 can also be seen as being mounted to the base laminate 54 of the hat stringer 26 as may occur during a co-curing or co-bonding operation of the hat stringer 26 to the skin member 12.

Figure 14:
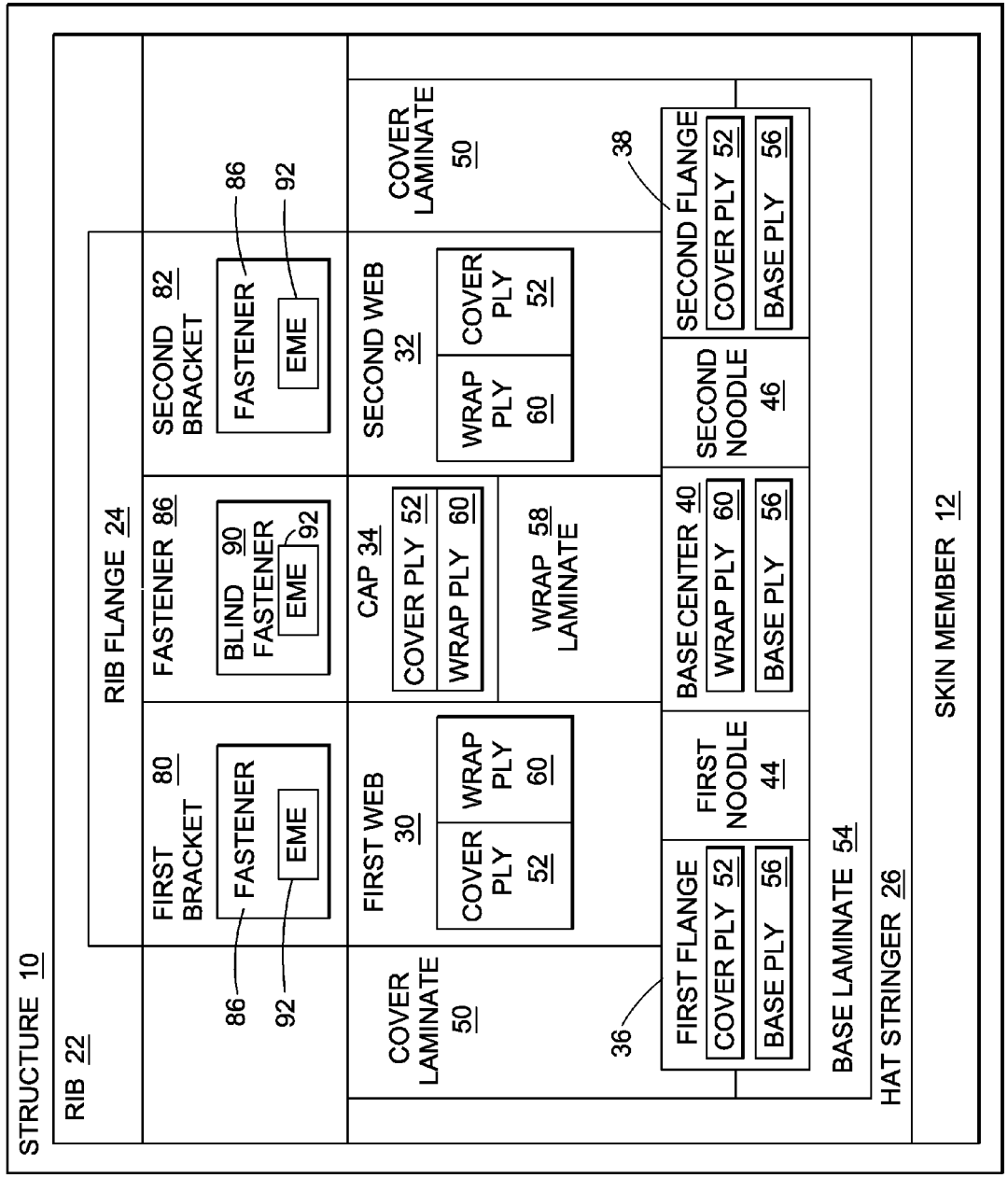
FIG. 14 functional block diagram of a structure comprising a rib attached to a hat stringer.

Referring to FIG. 14, shown is a block diagram of a structure 10 including a rib 22, a hat stringer 26 and a skin member 12. The rib 22 may be interconnected to the hat stringer 26 by means of one or more fasteners 86 such as a blind fastener 90 extending from the rib 22 into the cap 34 and/or by attachment to a first and second bracket 80, 82 which may be fastened to respective ones of the first and second webs 30, 32 of the hat stringer 26. The fasteners may include EME protection such as a coating 92 applied to the fastener 86 or an EME-resistant configuration of the fastener 86. The rib 22 may include one or more rib flanges 24 which may extend outwardly from the rib 22 to provide a means for attaching the rib 22 to the hat stringer 26.

The hat stringer 26 may be comprised of the wrap laminate 58, the cover laminate 50, the base laminate 54 and first and second noodles 44, 46. The wrap laminate 58 is comprised of a quantity of wrap plies 60 substantially equal in number to the quantity of cover plies 52 that make up the cover laminate 50. The cap 34 is comprised of wrap plies 60 and cover plies 52 as are the first and second webs 30, 32. The first and second flanges 36, 38 may be comprised of the cover plies 52 and the base plies 56. The base center 40 extends between the first and second flanges 36, 38 and may be comprised of the base plies 56 and the wrap plies 60. The base laminate 54 may comprise any quantity of base plies 56. The base laminate 54 interfaces with the skin member 12 to which the hat stringer 26 may be co-cured or co-bonded.

Figure 15:
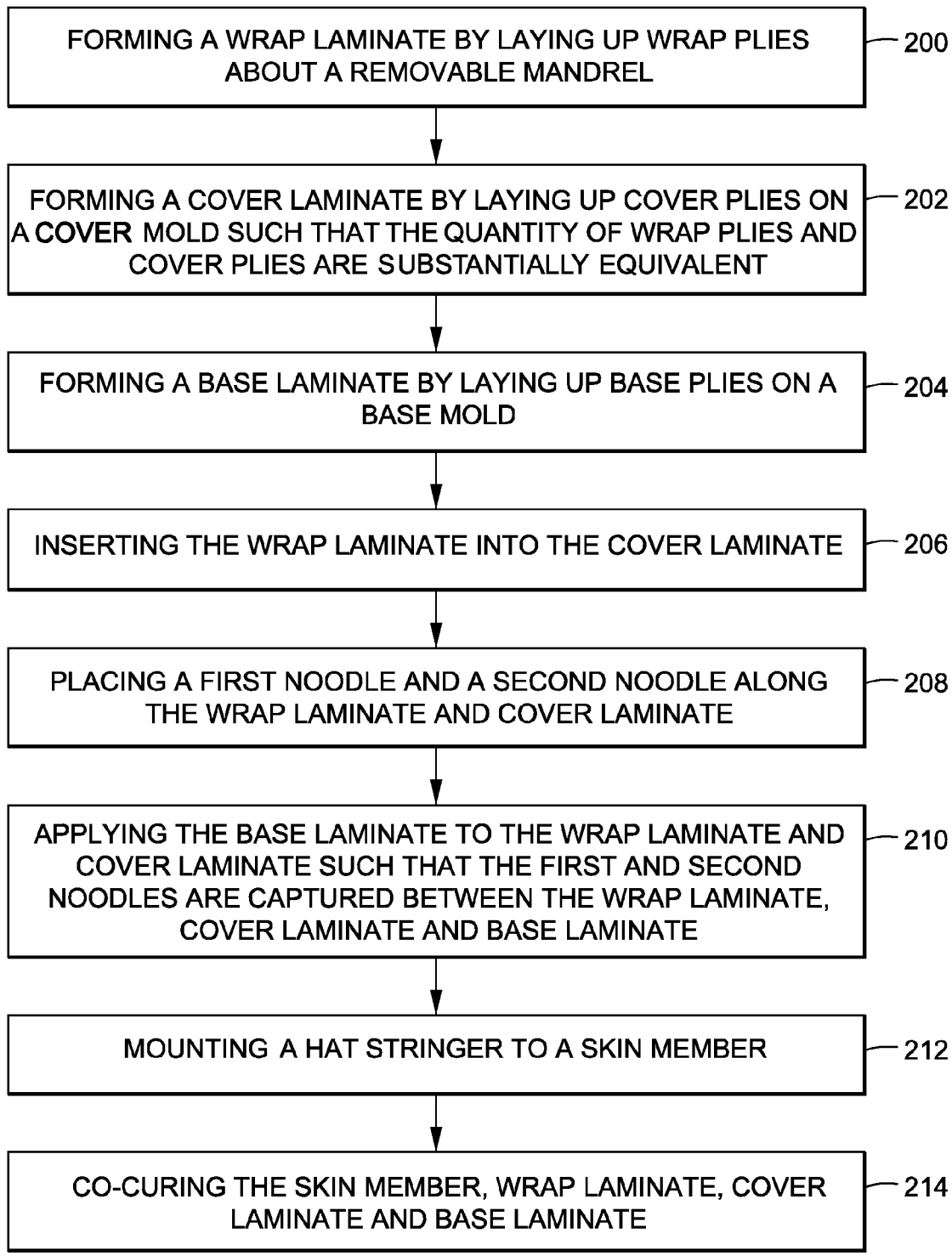
FIG. 15 is an illustration of a flow diagram for a methodology for forming a hat stringer.

Referring to FIG. 15, shown is an illustration of a flow diagram of a methodology for forming a hat stringer. Step 200 of the methodology may include forming the wrap laminate 58 by laying up wrap plies 60 (FIG. 6) about a removable mandrel 102 (FIG. 7) as illustrated in FIGS. 6 and 7 and described above. Step 202 may comprise forming the cover laminate 50 (FIG. 8) by laying up the cover plies 52 (FIG. 8) on the cover mold 110 (FIG. 8) in a quantity substantially equal to the quantity of wrap plies 60 (FIG. 5). As is indicated above, the substantially equal quantity of wrap and cover plies 60, 52 (FIG. 5) facilitates the efficient transfer of pulloff loads A (FIGS. 3A-3C and 4A-4C) in an out-of-plane direction E (FIGS. 3A-3C and 4A-4C) from the rib 22 (FIG. 3A) into the base portion 28 and skin member 12 to which the hat stringer 26 may be bonded. By providing a substantially equal quantity of wrap plies 60 (FIG. 5) and cover plies 52 (FIG. 5) of respective ones of the wrap laminate 58 (FIG. 5) and cover laminate 50 (FIG. 5), the load carrying capability of the first and second webs 30, 32 (FIG. 5) may be increased relative to a non-equivalent quantity of plies 60, 52 of the wrap laminate 58 and cover laminate 50. As shown in FIG. 8, the cover laminate 50 may be formed by laying up the cover plies 52 on the cover mold 110 as illustrated in FIG. 8 wherein the cover plies 52 of composite material may be sequentially installed such that the first cover ply 52 assumes the shape of the cover mold side walls 112 and cover mold surface 114. A successive quantity of cover plies 52 may be applied until the desired thickness is reached such that the interior surface of the cover laminate 50 is complementary to the outer surface of the wrap laminate 58.

In step 204 and referring to FIG. 11, the base laminate 54 may be formed by laying up base plies 56 on a base mold (not shown). Optionally, the base laminate 54 may comprise only a single one of the base plies 56. In this regard, the base laminate 54 may be formed of any quantity of base plies 56 and is not limited to the same quantity of base plies 56 that make up the wrap laminate 58 and cover laminate 50. Upon forming the wrap laminate 58, cover laminate 50 and base laminate 54, the wrap laminate 58 may then be inserted into the cover laminate 50 as described above such that the outer wrap surface 70 is placed into contact with the inner cover surface 72 as illustrated in FIG. 11. Step 208 may comprise placing the first noodle 44 and the second noodle 46 along the wrap laminate 58 and cover laminate 50 as illustrated in FIG. 11 followed by step 210 of applying the base laminate 54 to the wrap laminate 58 and cover laminate 50 such that the first and second noodles 44, 46 are captured between the wrap laminate 58, cover laminate 50 and base laminate 54 as illustrated in FIG. 11. To complete the assembly, the method may comprise step 212 of mounting the hat stringer 26 to the skin member 12 such as is illustrated in FIG. 12. In step 214, the skin member 12, wrap laminate 58, cover laminate 50, first and second noodles and base laminate 54 may be co-cured and/or co-bonded to form the composite structure 10 as illustrated in FIG. 12.

Referring still to FIGS. 7 and 11, as was indicated above, during the process of assembling the cover laminate 50, wrap laminate 58 and base laminate 54, adhesive 48 may be placed along the cover-wrap interface 64, wrap-base interface 66, and/or base-cover interface 62 as illustrated in FIG. 11 in order to facilitate bonding of the laminates 50, 54, 58. Likewise, the assembly of the laminates 50, 54, 58 may include the application of adhesive 48 to the surfaces of each one of the first and second noodles 44, 46 to facilitate bonding to the wrap laminate 58, cover laminate 50 and base laminate and to enhance the pulloff capability of the hat stringer 26 as illustrated in FIG. 11.

Figure 16:
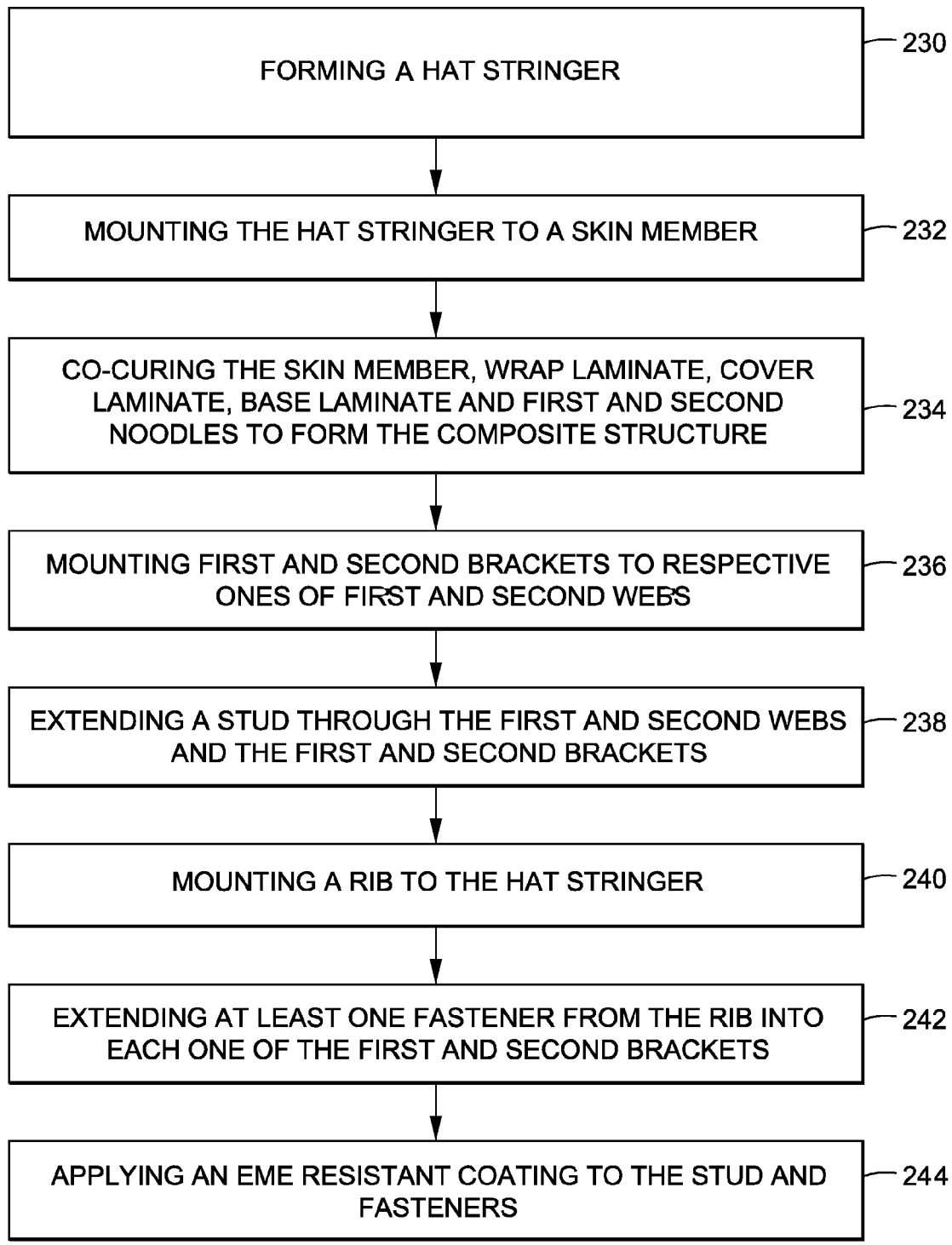
FIG. 16 is an illustration of a flow diagram for a methodology for assembling a structure by attaching a rib to a hat stringer.

Referring to FIG. 16, shown is an illustration of a flow diagram of a methodology for assembling a composite structure 10 wherein the hat stringer 26 may be attached to a structural element such as a rib 22 as illustrated in FIGS. 3A-3C and 4A-4C. The methodology illustrated in FIG. 16 comprises assembling the structure 10 (FIG. 3A-3C) such as, without limitation, a rib 22 fastened to the hat stringer 26. The method may include attaching the hat stringer 26 to the cap 34 and/or to one of the first and second webs 30, 32 of the hat stringer 26. The method of assembling the composite structure 10 may initially comprise forming the hat stringer 26 having the first and second webs 30, 32 in a manner as was described above with reference to FIG. 15. In this regard, step 230 may comprise forming the wrap laminate 58 by laying up wrap plies 60 about the removable mandrel 102 (FIG. 7) that may be formed complementary to the cover mold 110 (FIG. 8).

Referring still to FIG. 16, step 232 of the methodology may include mounting the hat stringer 26 to the skin member 12 (FIG. 11) such as by co-curing the skin member 12, wrap laminate 58, cover laminate 50, base laminate 54 and first and second noodles 44, 46 (FIG. 11) in step 234 in order to form the composite structure 10. Alternatively, the hat stringer 26 may be separately cured and may then be bonded such as in a co-bonding operation in order to attach the hat stringer 26 to the skin member 12. Step 236 of the methodology illustrated in FIG. 16 may comprise mounting first and second brackets 80, 82 to respective ones of the first and second webs 30, 32 as illustrated in FIGS. 4A-4D and described above. The methodology may further comprise step 238 including extending a stud 88 (FIGS. 4A-4D) of other elongate member (not shown) through the first and second webs 30, 32 and the first and second brackets 80, 82 (FIGS. 4A-4C) in order to provide a mechanism by which the rib 22 may be attached to the hat stringer 26. For example, a fastener (not shown) may be extended through the first bracket 80 (FIGS. 4A-4C) and into the first web 30 and cover laminate 50 and wrap laminate 54. A separate fastener (not shown) may be extended through the second bracket 82 (FIGS. 4A-4C) and into the second web 32 and cover laminate 50 and wrap laminate 54. Upon mounting the first and second brackets 80, 82 to the first and second webs 30, 32, step 240 may comprise mounting the rib 22 to the hat stringer 26 such as by extending at least one fastener 86 from the rib 22 into each one of the first and second brackets 80, 82 (FIGS. 4A-4C) in step 242.

For example, as shown in FIGS. 4A-4C, the fasteners 86 may be blind fasteners 90 which may be threadably engaged to a corresponding quantity of nuts 84 or other threaded receptacle configurations. The fasteners 86 may be attached to the first and second brackets 80, 82 by means of conventional threaded fasteners such as a nut 84 and bolt 94 combination wherein both ends of the fastener 86 are exteriorly accessible with conventional hand tools. Following mechanical attachment of the rib 22 to the hat stringer 26, step 244 in FIG. 16 may include the application of an EME resistant coating 92 to the opposite ends of the stud 88 in order to reduce the risk of electrical arcing as a result of transient current flowing through the stringer 26 and/or rib or skin member 12. In a further embodiment, the methodology may include attaching the rib 22 to the hat stringer 26 by means of extending a mechanical fastener such as a blind fastener 90 extending from the rib 22 into the cap 34 as illustrated in FIGS. 3A-3D. Preferably, the fastener 86 is installed in order to minimize electromagnetic effects by application of an EME resistant coating 92 to the exposed ends of the fastener 86.

Figure 17:
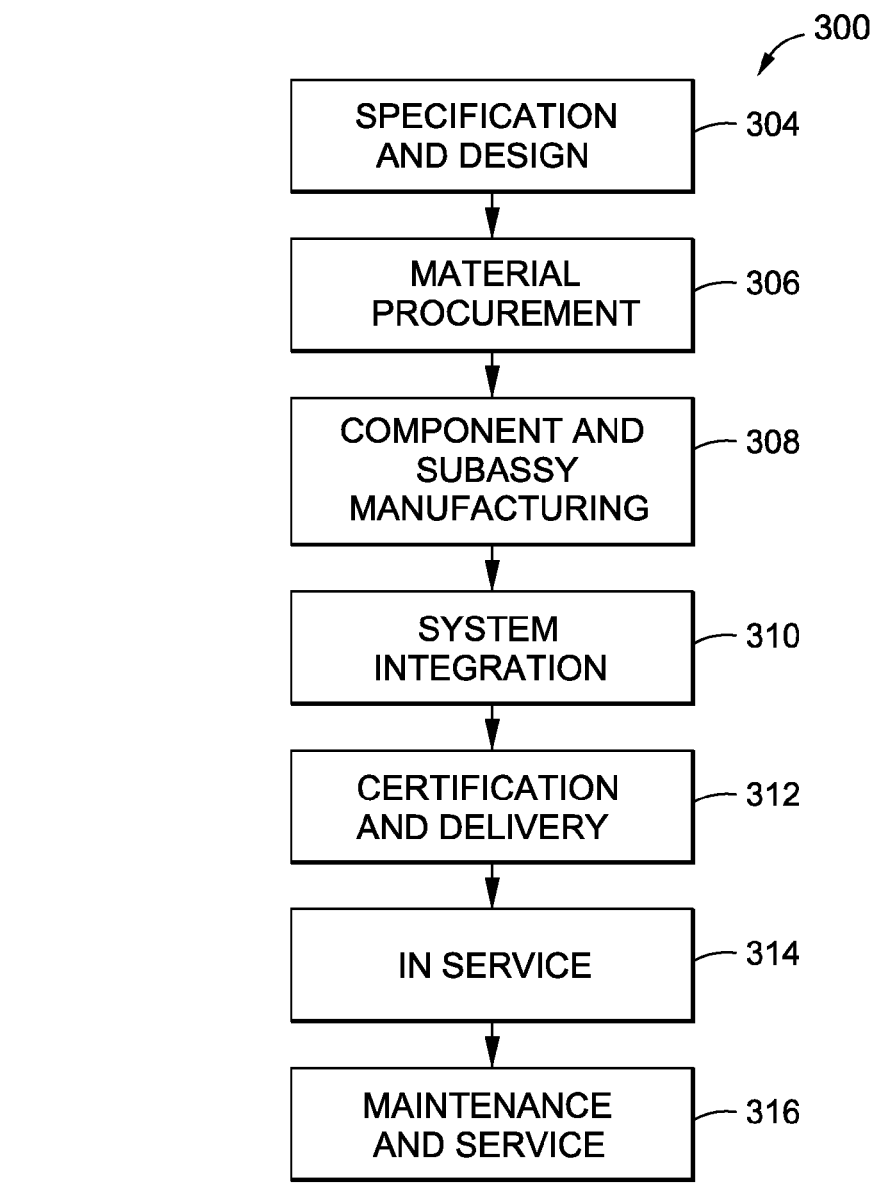
FIG. 17 is a flow diagram of an aircraft production and service methodology.
Figure 18:
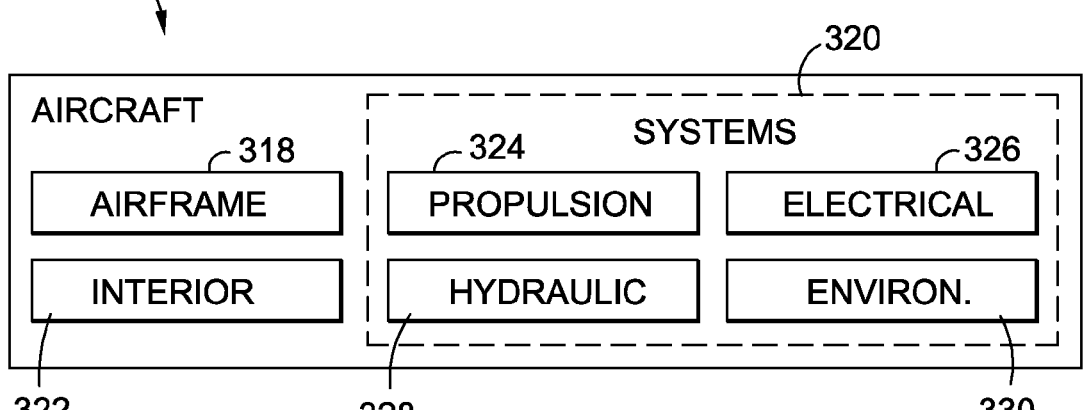
FIG. 18 is a block diagram of an aircraft.

Referring to FIGS. 17-18, embodiments of the disclosure may be described in the context of an aircraft manufacturing and service method 300 as shown in FIG. 17 and an aircraft 302 as shown in FIG. 18. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A structure, comprising:
   a skin member; and
   a hat stringer having a closed cross-section, including:
      a base portion;
      a first web and a second web extending outwardly from the base portion, each one of the first and second web being comprised of a wrap laminate having wrap plies and a cover laminate having cover plies;
      a cap interconnecting the first and second web;
   the hat stringer and skin member being co-cured; and
   a rib in direct abutting contact with and directly coupled to the hat stringer on at least one of the cap and the first and second web, the rib being disposed in non-contacting relation to the skin member.

2. The structure of claim 1 wherein:
   the cover plies are substantially equal in quantity to the wrap plies.

3. The structure of claim 1 wherein:
   the wrap laminate and cover laminate are formed of graphite-epoxy prepreg.

4. The structure of claim 1 wherein the hat stringer further comprises:
   a first noodle and a second noodle extending along the wrap laminate and cover laminate and being covered by a base laminate.

5. The structure of claim 1 further comprising:
   at least one bracket mounted to at least one of the first and second web, the rib being fastened to the bracket.

6. The structure of claim 5 wherein:
   the at least one bracket is adhesively bonded to at least one of the first and second web.

7. The structure of claim 5 wherein:
   the at least one bracket comprises first and second brackets respectively mounted to the first and second webs; and
   a fastener extending through the first and second webs and the first and second brackets.

8. The structure of claim 7 further comprising:
   at least one fastener extending from a rib flange into a first bracket and/or a second bracket.

9. The structure of claim 1 further comprising:
   a fastener extending from the rib into the cap.

10. The structure of claim 9 wherein the fastener is a blind fastener.

11. The structure of claim 1 wherein:
    the rib is adhesively bonded to a top surface of the cap.

12. The structure of claim 1 wherein:
    the hat stringer and the skin member comprise a portion of at least one of the following: a fuselage, a wing, a tail section.

13. A composite structure, comprising:
    a skin member;
    a hat stringer co-cured with the skin member and having a closed cross-section, the hat stringer including:
       a base portion;
       a first web and a second web extending outwardly from the base portion, each one of the first and second webs being comprised of a wrap laminate having wrap plies and a cover laminate having cover plies in substantially equal quantity to the wrap plies;
       a cap interconnecting the first and second webs; and
       a first noodle and a second noodle extending along the wrap laminate and cover laminate;
    first and second brackets respectively mounted to the first and second webs by a stud extending therethrough; and
    a rib in direct abutting contact with and directly fastened to the first and second brackets of the hat stringer, the rib being disposed in non-contacting relation to the skin member.

14. An aircraft, comprising:
    at least one skin member;
    a plurality of hat stringers coupled to the skin member, each hat stringer having a closed cross-section and including:
       a base portion;
       a first web and a second web extending outwardly from the base portion, each one of the first and second webs being comprised of a wrap laminate having wrap plies and a cover laminate having cover plies;
       a cap interconnecting the first and second web; and
    a plurality of ribs each including a rib flange on an upper edge and/or a lower edge of the rib, the rib flanges being in direct abutting contact with and directly coupled to the hat stringers on at least one of the first and second web and the cap of the hat stringers, the ribs being disposed in non-contacting relation to the skin member.

15. The aircraft of claim 14 wherein:
    the hat stringer and the skin member comprise a portion of at least one of the following: a fuselage, a wing, a horizontal tail, a vertical tail.

16. The aircraft of claim 14 wherein:
    the at least one skin member comprises upper and lower skin members;
    the plurality of hat stringers being coupled to the upper and lower skin members; and
    the rib flanges on the upper edge and lower edge of the ribs being coupled to at least one of the first and second web and the cap of the hat stringers.

17. The aircraft of claim 14 further comprising:
    a front spar and a rear spar; and
    at least one of the ribs having opposing ends being respectively secured to the front spar and the rear spar.

18. The aircraft of claim 14 further comprising:
    at least one bracket attaching at least one rib-to at least one of the first and second web of at least one hat stringer.

* * * * *